(12) United States Patent
Kim et al.

(10) Patent No.: US 11,814,144 B2
(45) Date of Patent: Nov. 14, 2023

(54) METHOD FOR ASSEMBLING WIND POWER GENERATOR BY USING INSTALLATION SHIP FOR FLOATING-TYPE OFFSHORE WIND POWER GENERATION

(71) Applicant: ACE E&T (ENGINEERING & TECHNOLOGY), Ulsan (KR)

(72) Inventors: Day Hwan Kim, Ulsan (KR); Soo Han Kim, Ulsan (KR)

(73) Assignee: ACE E&T (ENGINEERING & TECHNOLOGY), Ulsan (KR)

( * ) Notice: Subject to any disclaimer, the term of this patent is extended or adjusted under 35 U.S.C. 154(b) by 1 day.

(21) Appl. No.: 17/895,459

(22) Filed: Aug. 25, 2022

(65) Prior Publication Data
US 2023/0086622 A1    Mar. 23, 2023

(30) Foreign Application Priority Data

Sep. 23, 2021 (KR) ........................ 10-2021-0125573

(51) Int. Cl.
*F03D 13/40* (2016.01)
*F03D 13/25* (2016.01)
(Continued)

(52) U.S. Cl.
CPC .............. *B63B 73/60* (2020.01); *B63B 35/44* (2013.01); *B63B 77/00* (2020.01); *F03D 13/25* (2016.05);
(Continued)

(58) Field of Classification Search
CPC ........................... Y10T 29/49316; F03D 13/40
See application file for complete search history.

(56) References Cited

U.S. PATENT DOCUMENTS 8,496,423 B2 * 7/2013 Springett ................ B63B 27/16
416/142
9,410,528 B2 * 8/2016 Westergaard ........... F03D 13/40
(Continued)

FOREIGN PATENT DOCUMENTS

KR    10-2015-0082826 A    7/2015
KR       10-1711958 B1    3/2017
(Continued)

OTHER PUBLICATIONS

Notice of Allowance dated Oct. 31, 2021 from Korean Patent Office in a counterpart Korean Patent Application No. 10-2021-0125573 (all the cited references are listed in this IDS.) (English translation is also submitted herewith.).

*Primary Examiner* — Sarang Afzali
(74) *Attorney, Agent, or Firm* — The PL Law Group, PLLC

(57) ABSTRACT

In a method for assembling a wind power generator, a tower of a floating-type offshore wind power generation device is placed and fixed to a tower standing frame, blades of the floating-type offshore wind power generation device are fixed and stacked on a first mount and a second mount, a carriage is used to move a blade installing structure including a blade assembly table formed on a first side and a blade carrier formed on a second side opposite to the first side, the blade carrier is vertically moved below the blades, the blade carrier is vertically moved to correspond to the height of the blade assembly table in a state in which the blade is gripped by the blade installer, the blade installer is moved from the second side to the first side, and the blade is assembled to a nacelle formed at one end of the tower.

10 Claims, 25 Drawing Sheets

(51) Int. Cl.
*B63B 73/60* (2020.01)
*B63B 77/00* (2020.01)
*B63B 35/44* (2006.01)

(52) U.S. Cl.
CPC ........ *F03D 13/40* (2016.05); *B63B 2035/446* (2013.01); *F05B 2230/6102* (2013.01); *F05B 2240/912* (2013.01); *F05B 2240/95* (2013.01); *Y10T 29/49316* (2015.01)

(56) References Cited

U.S. PATENT DOCUMENTS

| | | | |
|---|---|---|---|
| 10,906,785 B2* | 2/2021 | Van Wingerden | B66C 23/52 |
| 2010/0067989 A1* | 3/2010 | Brown | B63B 35/003 |
| | | | 405/196 |
| 2012/0255478 A1* | 10/2012 | Hadeler | E02B 17/027 |
| | | | 114/61.31 |

FOREIGN PATENT DOCUMENTS

| | | | | |
|---|---|---|---|---|
| KR | 10-2239542 B1 | 4/2021 | | |
| WO | WO-2009068038 A1 * | 6/2009 | ............... | B66C 1/62 |

\* cited by examiner

METHOD FOR ASSEMBLING WIND POWER GENERATOR BY USING INSTALLATION SHIP FOR FLOATING-TYPE OFFSHORE WIND POWER GENERATION

CROSS-REFERENCE TO RELATED APPLICATION AND CLAIM OF PRIORITY

This application claims the benefit under 35 U.S.C. § 119 of Korean Patent Application No. 10-2021-0125573 filed on Sep. 23, 2021, in the Korean Intellectual Property Office, the entire disclosure of which is incorporated herein by reference for all purposes.

BACKGROUND

Embodiments of the present disclosure relate to a technique of assembling a floating-type offshore wind power generation device on the sea.

In general, wind power generation converts wind energy into mechanical energy by using devices such as wind turbines, and uses this energy to operate electric generators to produce electricity. Here, the wind power generation is classified into onshore-type wind power generation and offshore-type wind power generation depending on installation locations. In addition, recently, for the offshore wind power generation, research and development on floating-type offshore wind power generation devices, in which lower floating bodies are not fixed on the seabed but float on the sea, are being actively conducted.

In order to install such a floating-type offshore wind power generation device on the sea, it is essential to assemble blades to a nacelle formed at one end of a tower. This assembly process is performed on the sea, and according to the related art, it is common to assemble the blades to the nacelle using a large crane. However, this assembly method is greatly affected by offshore environment and weather such as wind and waves, and the construction period becomes long.

SUMMARY

Embodiments of the present disclosure provide a method for assembling a floating-type offshore wind power generation device suitable for offshore environment.

In accordance with an exemplary embodiment of the present disclosure, provided is a method for assembling a wind power generator by using an installation ship for floating-type offshore wind power generation, the method including: placing and fixing a tower of a floating-type offshore wind power generation device to a tower standing frame provided on the bottom surface of the installation ship; fixing and stacking a plurality of blades of the floating-type offshore wind power generation device on a first mount and a second mount provided on the bottom surface of the installation ship; using a carriage to move a blade installing structure, which includes a blade assembly table formed on a first side and a blade carrier formed on a second side opposite to the first side, thereby positioning the blade installing structure between the tower and the blades; vertically moving the blade carrier below the blades so that a blade installer provided on the blade carrier grips each of the blades; vertically moving the blade carrier to correspond to the height of the blade assembly table in a state in which the blade is gripped by the blade installer; moving the blade installer from the second side to the first side; and assembling the blade to a nacelle formed at one end of the tower.

The placing and fixing of the tower of the floating-type offshore wind power generation device to the tower standing frame may include: providing a slide rail on the bottom surface of the installation ship; placing the standing support on the slide rail; placing the tower standing frame on the standing support; and fixing the tower by using a gripping means provided in the tower standing frame.

The method for assembling the floating-type offshore wind power generation device may further include after the assembling of the blade to the nacelle formed at the one end of the tower: assembling the other blades except for the assembled blade to the nacelle at set angle intervals; and standing the tower placed on the tower standing frame in a state in which the plurality of blades are assembled.

The standing of the tower may include: placing a stopper and a skid jack on the slide rail; pushing or pulling the standing support, by using the skid jack between the standing support and the stopper, to move the tower standing frame and the tower to a set position; and standing the tower by using one or more lifters provided in the tower standing frame.

The pushing or pulling of the standing support, by using the skid jack, to move the tower standing frame and the tower to the set position may include: providing a plurality of locking devices on one side surface of the slide rail at set intervals; fastening and fixing the stopper to one of the plurality of locking devices; and pushing or pulling the standing support, in a state in which the skid jack is supported by the stopper, thereby moving the tower standing frame and the tower to the set position.

The fixing and stacking of the plurality of blades on the first mount and the second mount may include: placing and fixing one end of the blade to one of a plurality of first mounting means provided at different heights on the first mount; and placing and fixing the other end of the blade to one of a plurality of second mounting means provided at different heights on the second mount.

The placing and fixing of the other end of the blade to the one of the plurality of second mounting means may include: providing, above the second mounting means, a support which has a circular shape and a size corresponding to the circumference of the other end of the blade; and inserting the other end of the blade into the support.

The assembling of the other blades except for the assembled blade to the nacelle at the set angle intervals may include: opening the first mounting means by moving a coupling tightener which is provided at a central portion of the first mounting means positioned above the other blades; moving backward the second mounting means, which is positioned above the other blades, in a direction away from the other ends of the other blades; and moving the other blades upward and assembling the other blades to the nacelle.

The gripping of the blade by using the blade installer may include: providing a plurality of gripping plates at different positions of the blade installer; providing a hydraulic jack and a rotary center point at a position adjacent to each of the gripping plates; and rotating the gripping plate about the rotary center point or moving the gripping plate forward or backward according to an increase or decrease in pressure in the hydraulic jack, thereby bringing the gripping plate into close contact with the blade.

The assembling of the blade to the nacelle formed at the one end of the tower may include tilting the blade installer at a set angle and assembling the blade to the nacelle in a state in which the blade installer tilts.

BRIEF DESCRIPTION OF THE DRAWINGS

Exemplary embodiments can be understood in more detail from the following description taken in conjunction with the accompanying drawings, in which.

DETAILED DESCRIPTION

Hereinafter, a specific embodiment of the present disclosure will be described with reference to the drawings. The following detailed description is provided for a comprehensive understanding of methods, devices, and/or systems described herein. However, this is merely an example, and the present disclosure is not limited thereto.

In describing the embodiments of the present disclosure, if it is determined that the detailed description of a well-known technology related to the present disclosure unnecessarily obscures subject matters of the present disclosure, the detailed description thereof will be omitted. Also, the terms to be described below are terms defined in consideration of functions in the present disclosure, and thus, these terms may vary according to intentions or customs of users and operators. Therefore, the definition thereof should be made based on the content throughout this specification. The terms used in the detailed description are for the purpose of describing embodiments of the present disclosure only, and these terms should not be restrictive. Unless explicitly used otherwise, expressions in the singular form include the meaning of the plural form. In this description, an expression such as "comprising" or "including" is intended to indicate certain features, numbers, steps, operations, elements, and a part or combination thereof, and it should not be construed to exclude the presence or possibility of one or more other features, numbers, steps, operations, elements, and a part or combination thereof, which are other than those described.

Figure 1:
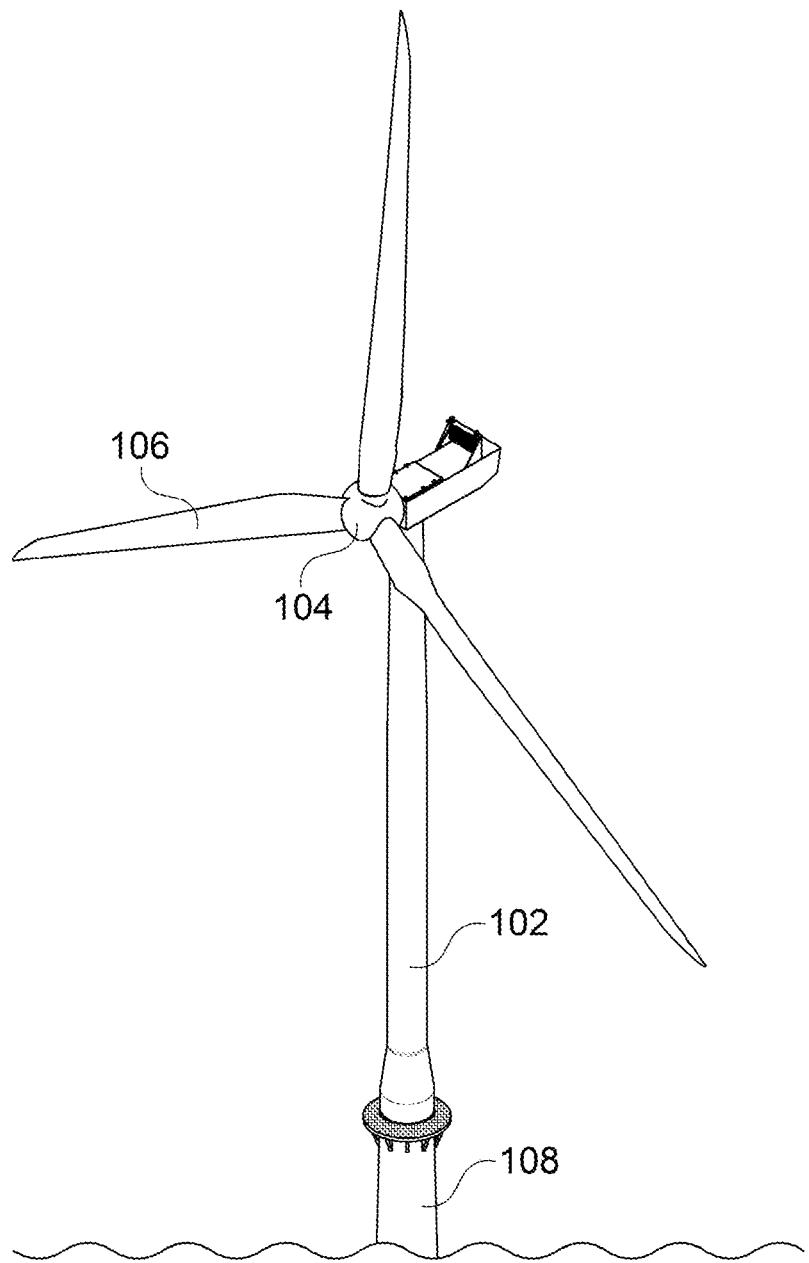
FIG. 1 is an example of a floating-type offshore wind power generation device according to an embodiment of the present disclosure.

FIG. 1 is an example of a floating-type offshore wind power generation device 100 according to an embodiment of the present disclosure. The floating-type offshore wind power generation device 100 is a device that is coupled to a floating body 108 floating on the sea and generates electricity, and includes a tower 102, a nacelle 104, and a blade 106.

The tower 102 is a support post of the offshore wind power generation device 100 and may be coupled to the floating body 108. The tower 102 may extend in one direction and have a circular cross-section.

The nacelle 104 is a body of the offshore wind power generation device 100 and may be provided at one end of the tower 102. The nacelle 104 may be provided with a plurality of hubs, and a plurality of blades 106 may be coupled to the nacelle 104 through the hubs. The plurality of hubs may be provided, for example, at intervals of about 120 degrees on the nacelle 104.

The blade 106 is a wing that is coupled to the nacelle 104 and rotated by wind. As illustrated in FIG. 1, three blades 106 may be coupled to the nacelle 104 at set angular intervals, but the number of the blades 106 and intervals therebetween are not limited thereto.

In order to install such a floating-type offshore wind power generation device 100 on the sea, it is essential to assemble the blades 106 to the nacelle 104 formed at one end of the tower 102. This assembly process is performed on the sea, and according to the related art, it is common to assemble the blades 106 to the nacelle 104 using a large crane. However, this case is greatly affected by offshore environment and weather.

Thus, the present disclosure provides a method through which the tower 102, the nacelle 104, and the blades 106 of the floating-type offshore wind power generation device 100 can be more easily assembled, and this will be described in more detail with reference to the drawings.

Figure 2:
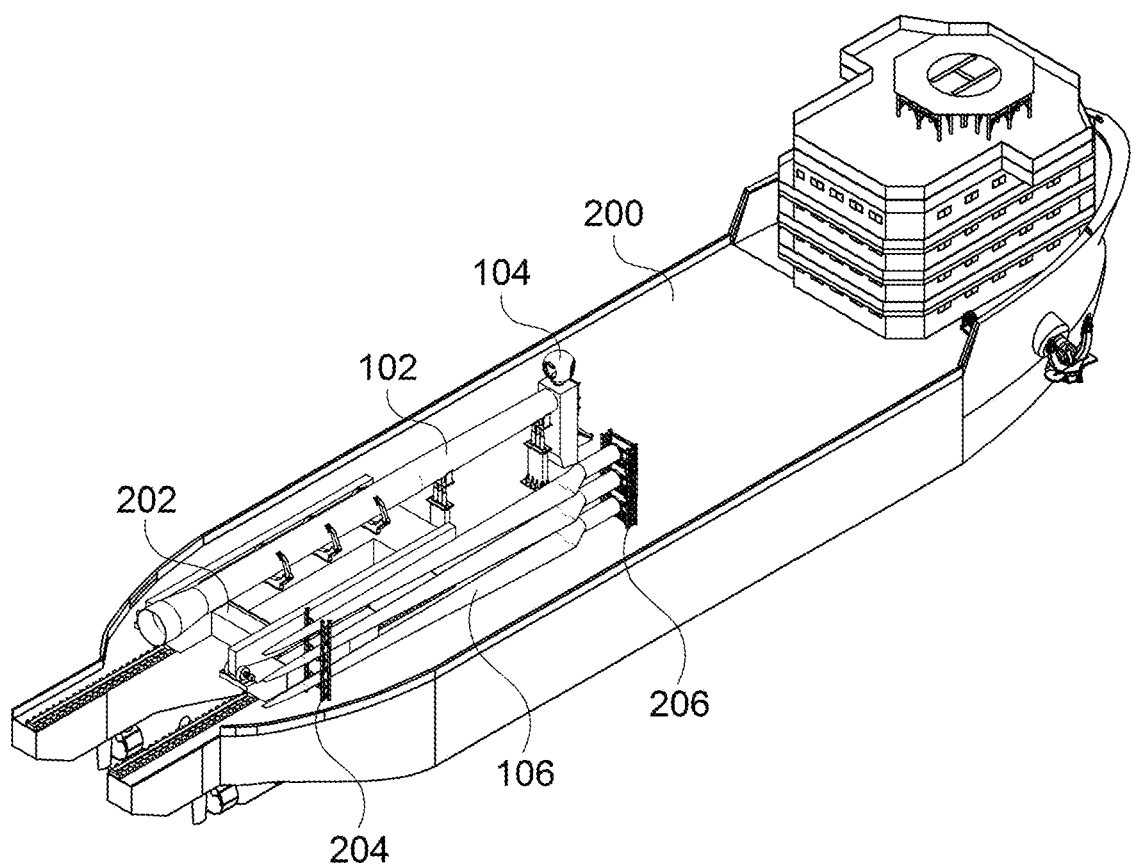
FIG. 2 is an example showing a state in which the floating-type offshore wind power generation device is placed on an installation ship according to an embodiment of the present disclosure.

FIG. 2 is an example showing a state in which the floating-type offshore wind power generation device 100 is placed on an installation ship 200 according to an embodiment of the present disclosure.

As illustrated in FIG. 2, the floating-type offshore wind power generation device 100 may be shipped and transported on the installation ship 200. Here, the tower 102, the nacelle 104, and the blades 106 may be shipped and transported while lying on the installation ship 200.

As described later, the tower 102 may be placed on and fixed to a tower standing frame 202 which is provided on the bottom surface of the installation ship 200. Also, the plurality of blades 106 may be fixed to and stacked on a first mount 204 and a second mount 206 which are provided on the bottom surface of the installation ship 200. Here, one end of each of the blades 106 may be fixed to the first mount 204, and the other end of each of the blades 106 may be fixed to the second mount 206. As described above, the tower 102 and the plurality of blades 106 may be transported while being disassembled with each other and fixed to the installation ship 200.

Figure 3:
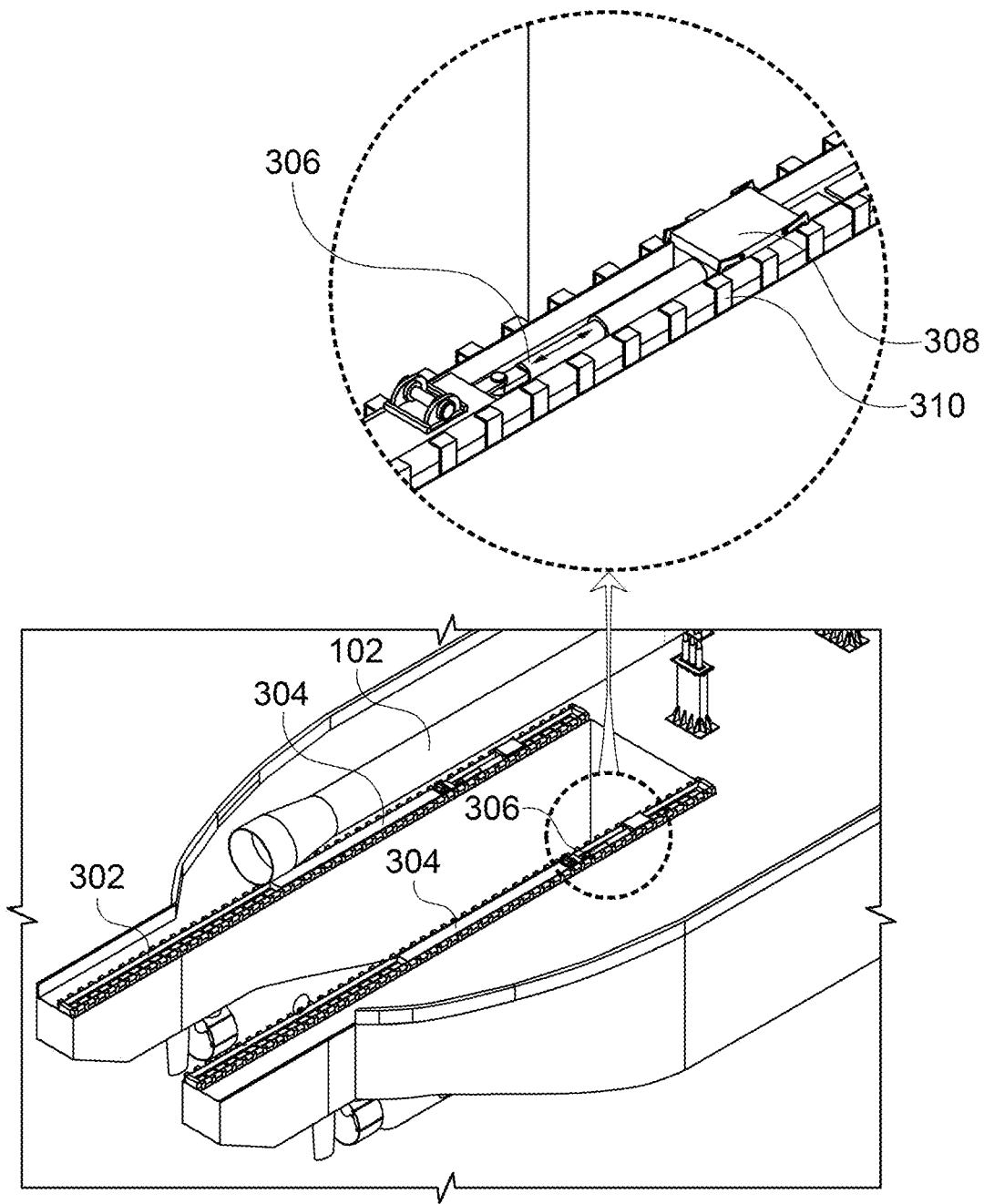
FIG. 3 is an example showing a slide rail and a standing support which are provided on the bottom surface of the installation ship according to an embodiment of the present disclosure.
Figure 4:
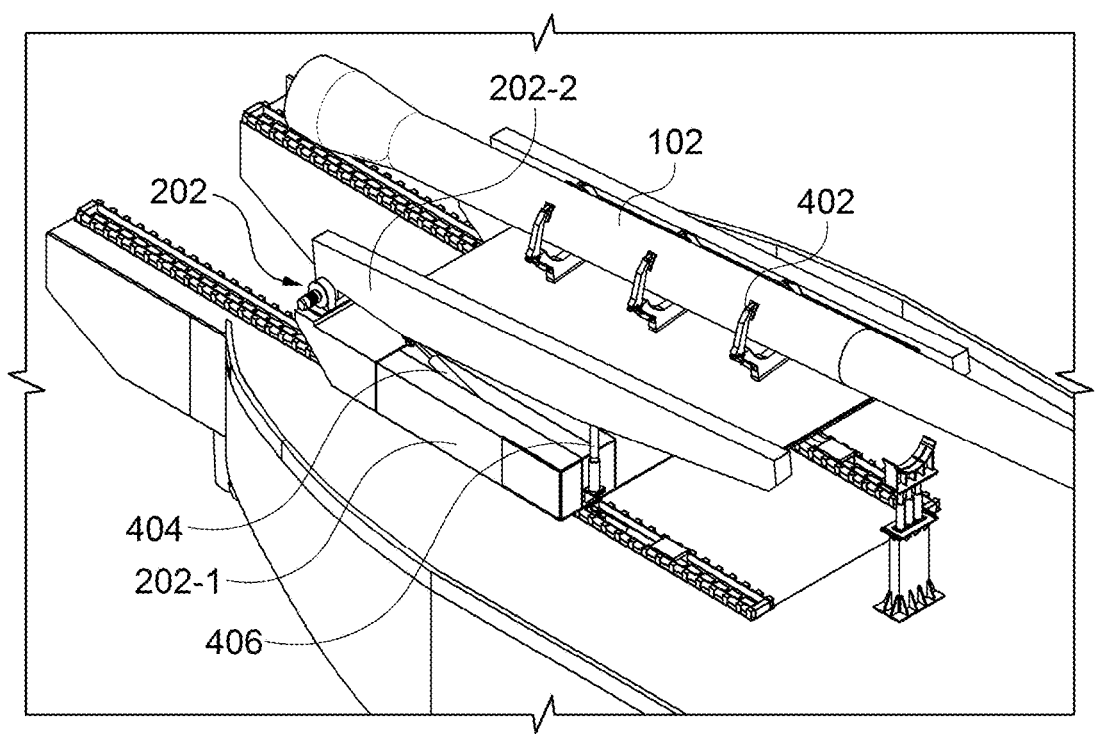
FIG. 4 is an example showing a state in which the tower of the floating-type offshore wind power generation device is placed on and fixed to a tower standing frame according to an embodiment of the present disclosure.

FIG. 3 is an example showing a slide rail 302 and a standing support 304 which are provided on the bottom surface of the installation ship 200 according to an embodiment of the present disclosure, and FIG. 4 is an example showing a state in which the tower 102 of the floating-type offshore wind power generation device 100 is placed on and fixed to a tower standing frame 202 according to an embodiment of the present disclosure.

Referring to FIG. 3, the slide rail 302 may be provided on the bottom surface of the installation ship 200 and extend in one direction. The slide rail 302 is a rail for guiding the movement of the tower standing frame 202, and the standing support 304, on which the tower standing frame 202 is placed, may be provided on the slide rail 302.

The standing support 304 may be provided on the slide rail 302, and may be placed on groove portions of the slide rail 302 so as to be movable on the slide rail 302. Here, the standing support 304 may be smaller than the overall length of the slide rail 302.

Referring to FIG. 4, the tower standing frame 202 may be placed on the standing support 304. As illustrated in FIG. 4, the tower standing frame 202 may include a first body 202-1 and a second body 202-2. The first body 202-1 may be placed on the groove portions of the slide rail 302, and the second body 202-2 may be connected to the first body 202-1 through lifters 404 and 406 which will be described later. Here, the tower 102 may be placed on and fixed to the second body 202-2. Also, a plurality of gripping means 402 may be provided on the second body 202-2, and the tower 102 may be fixed by the gripping means 402. The tower standing frame 202 may move along the slide rail 302 together with the standing support 304. Also, the plurality of lifters 404 and 406 may be provided on one side of the tower standing frame 202. Here, a first lifter 404 may stand the tower 102 by increasing or decreasing the length thereof in a manner such as hydraulic adjustment or motor control. Also, a second lifter 406 may vertically lift the second body 202-2 so that the tower 102 placed on the tower standing frame 202 is inclined at a set angle (e.g., about 3 degrees). Accordingly, a standing process of the tower 102 may be performed more easily, which will be described later.

Also, a skid jack 306 and a stopper 308 may be provided on the slide rail 302. The skid jack 306 may be provided between the standing support 304 and the stopper 308 and push or pull the standing support 304 to move the tower standing frame 202 and the tower 102 to the set positions. Here, a plurality of locking devices 310 may be provided on one side surface of the slide rail 302 at set intervals, and the stopper 308 may be fastened and fixed to one of the plurality of locking devices 310. The skid jack 306 may push or pull the standing support 304 while being supported by the stopper 308, and may move the tower standing frame 202 and the tower 102 to the set positions. Here, the skid jack 306 may push or pull the standing support 304 by increasing or decreasing the length thereof in a manner such as hydraulic adjustment or motor control. Also, a locker is provided on one side surface of the stopper 308, and the position of the stopper 308 may be fixed as the locker is locked to one of the plurality of locking devices 310.

Figure 5:
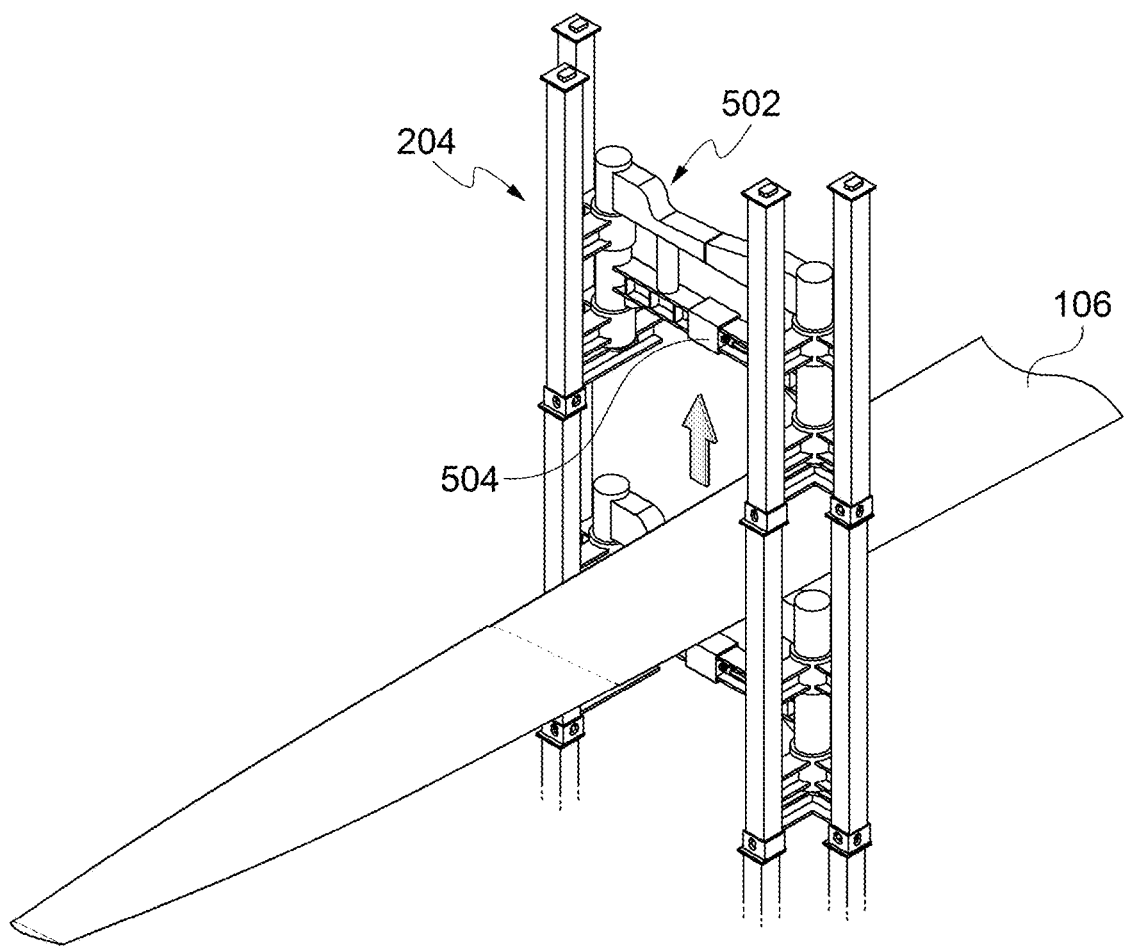
FIG. 5 is an example showing a state in which one end of a blade of the floating-type offshore wind power generation device is fixed to a first mount according to an embodiment of the present disclosure.
Figure 6:
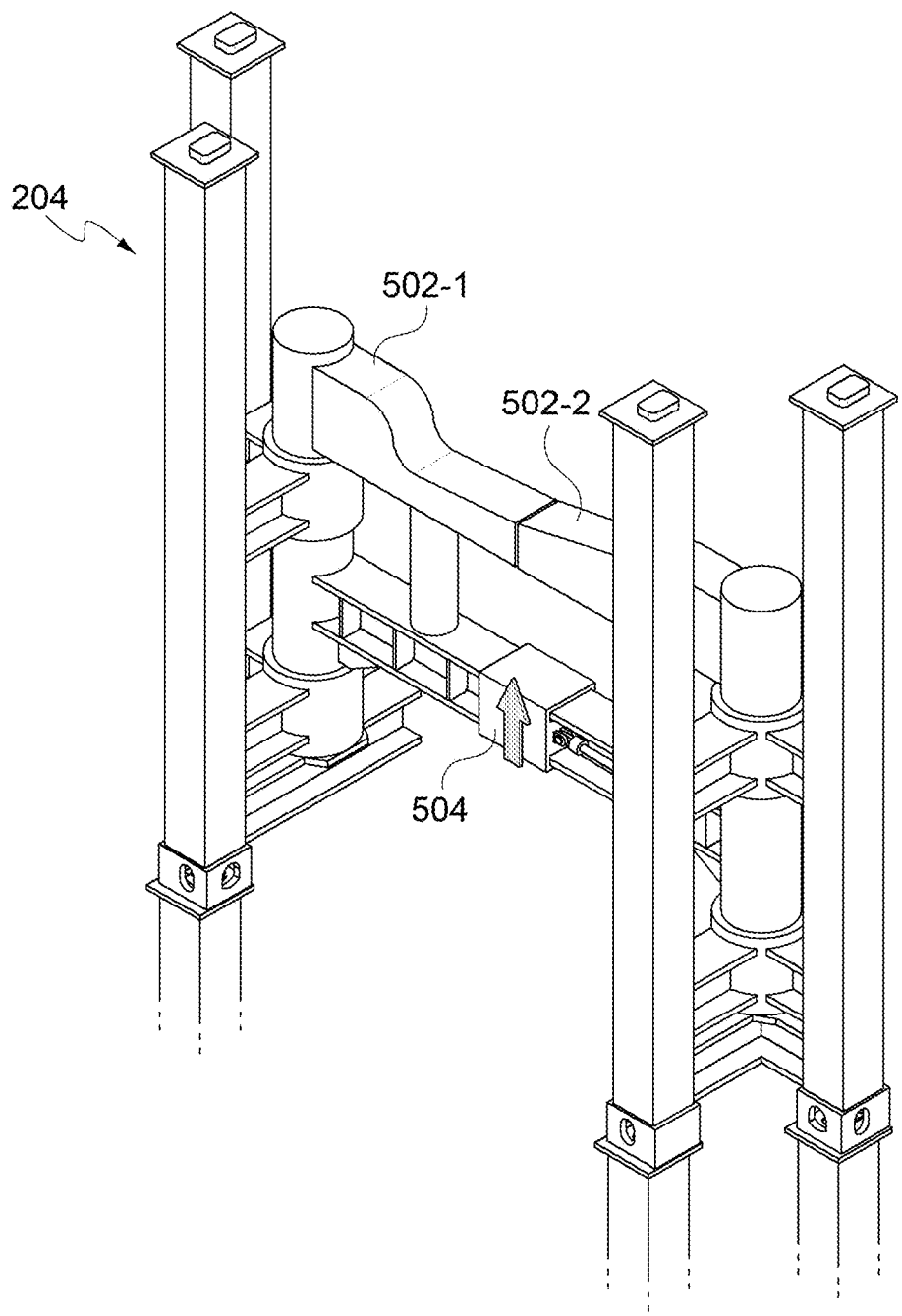
FIG. 6 is an example showing a process of opening a first mounting means to lift up the blade fixed to the first mount according to an embodiment of the present disclosure.
Figure 7:
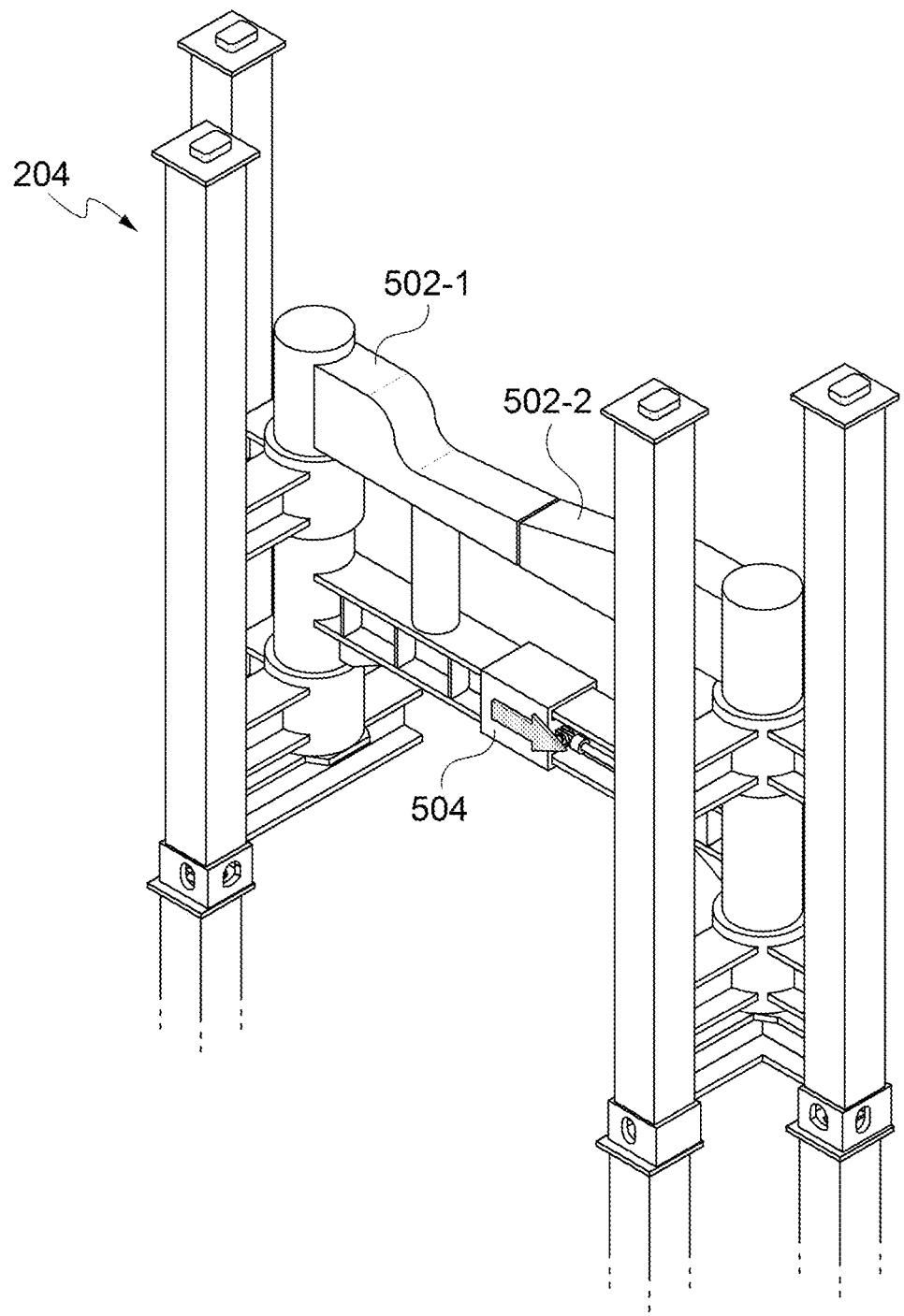
FIG. 7 is an example showing a process of opening a first mounting means to lift up the blade fixed to the first mount according to an embodiment of the present disclosure.
Figure 8:
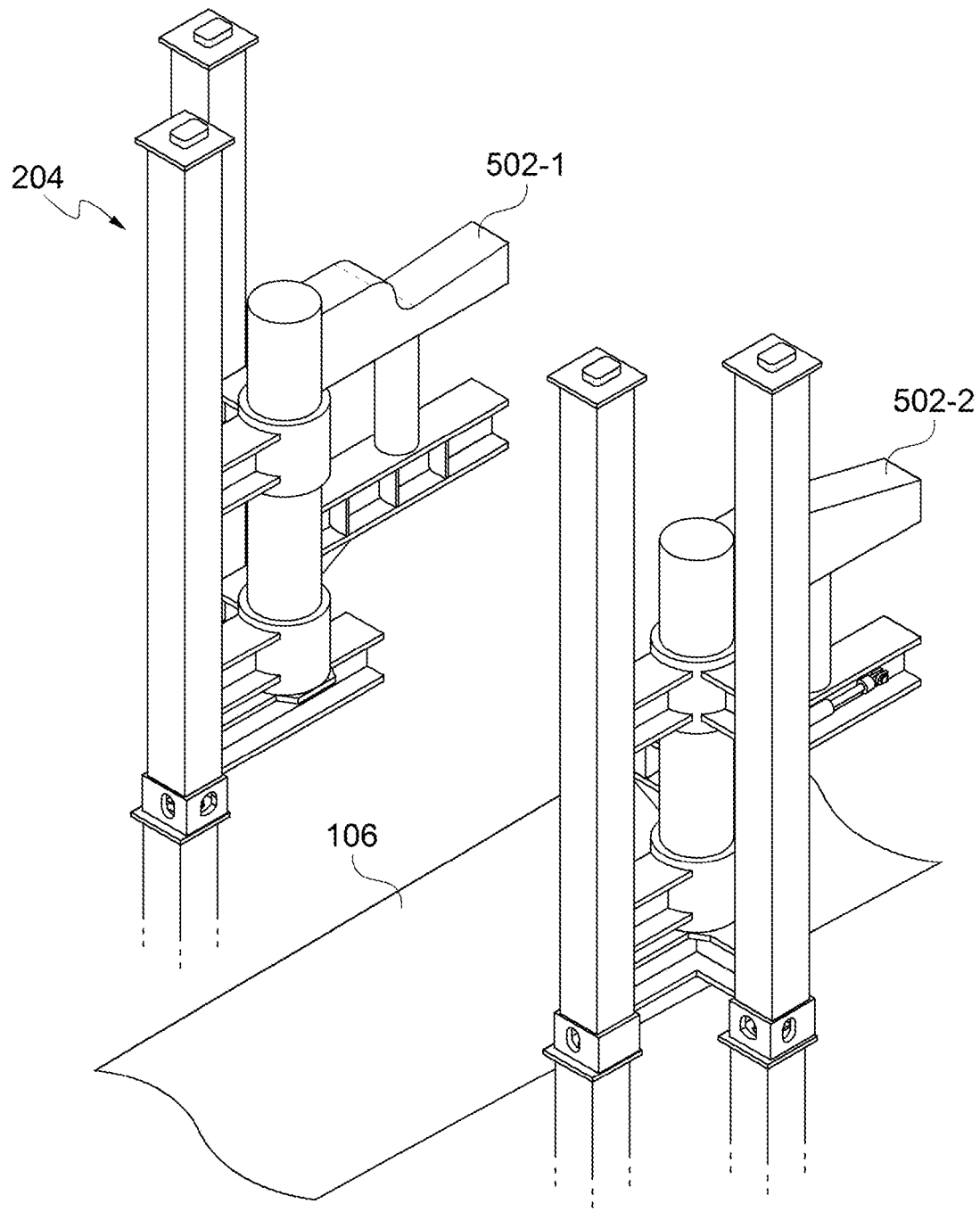
FIG. 8 is an example showing a process of opening a first mounting means to lift up the blade fixed to the first mount according to an embodiment of the present disclosure.

FIG. 5 is an example showing a state in which one end of the blade 106 of the floating-type offshore wind power generation device 100 is fixed to the first mount 204 according to an embodiment of the present disclosure, and FIGS. 6 to 8 are an example showing a process of opening a first mounting means 502 to lift up the blade 106 fixed to the first mount 204 according to an embodiment of the present disclosure.

As described above, one end of each of the blades 106 may be fixed to and stacked on the first mount 204. Here, the first mount 204 may include a first mounting means 502 and a coupling tightener 504.

As illustrated in FIG. 5, a plurality of first mounting means 502 may be provided at different heights on the first mount 204, and one end of the blade 106 may be placed on and fixed to one of the plurality of first mounting means 502. Here, the first mounting means 502 may include a first section 502-1 and a second section 502-2.

Also, the coupling tightener 504 may be formed at a central portion of the first mounting means 502, and the first mounting means 502 may be open according to the movement of the coupling tightener 504. After one of the plurality of blades 106 is coupled to the nacelle 104 of the tower 102, the other blades except for the blade 106 have to be lifted upward and assembled to the nacelle 104 of the tower 102. Physical interference between the first mounting means 502 and the blade 106 should not occur in the process of vertically moving the blade 106 as described above, and thus, it is necessary to open the first mounting means 502.

To this end, in the present disclosure, the first mounting means 502 is configured to open as the coupling tightener 504 provided at the central portion of the first mounting means 502 moves.

Referring to FIGS. 6 to 8, the first section 502-1 and the second section 502-2 of the first mounting means 502 may be coupled to each other through the coupling tightener 504, and in this state, the blade 106 may be safely placed on the first mounting means 502. Subsequently, when the blade 106 is to be moved vertically, the coupling tightener 504 may be moved in a specific direction by using a hydraulic jack (not shown) or the like (see FIG. 7). In this case, the first mounting means 502 may be opened by releasing the coupling between the first section 502-1 and the second section 502-2 (see FIG. 8). When the first mounting means 502 is opened through the above process, the blade 106 placed below the open first mounting means 502 may be moved vertically and assembled to the nacelle 104 of the tower 102.

Figure 9:
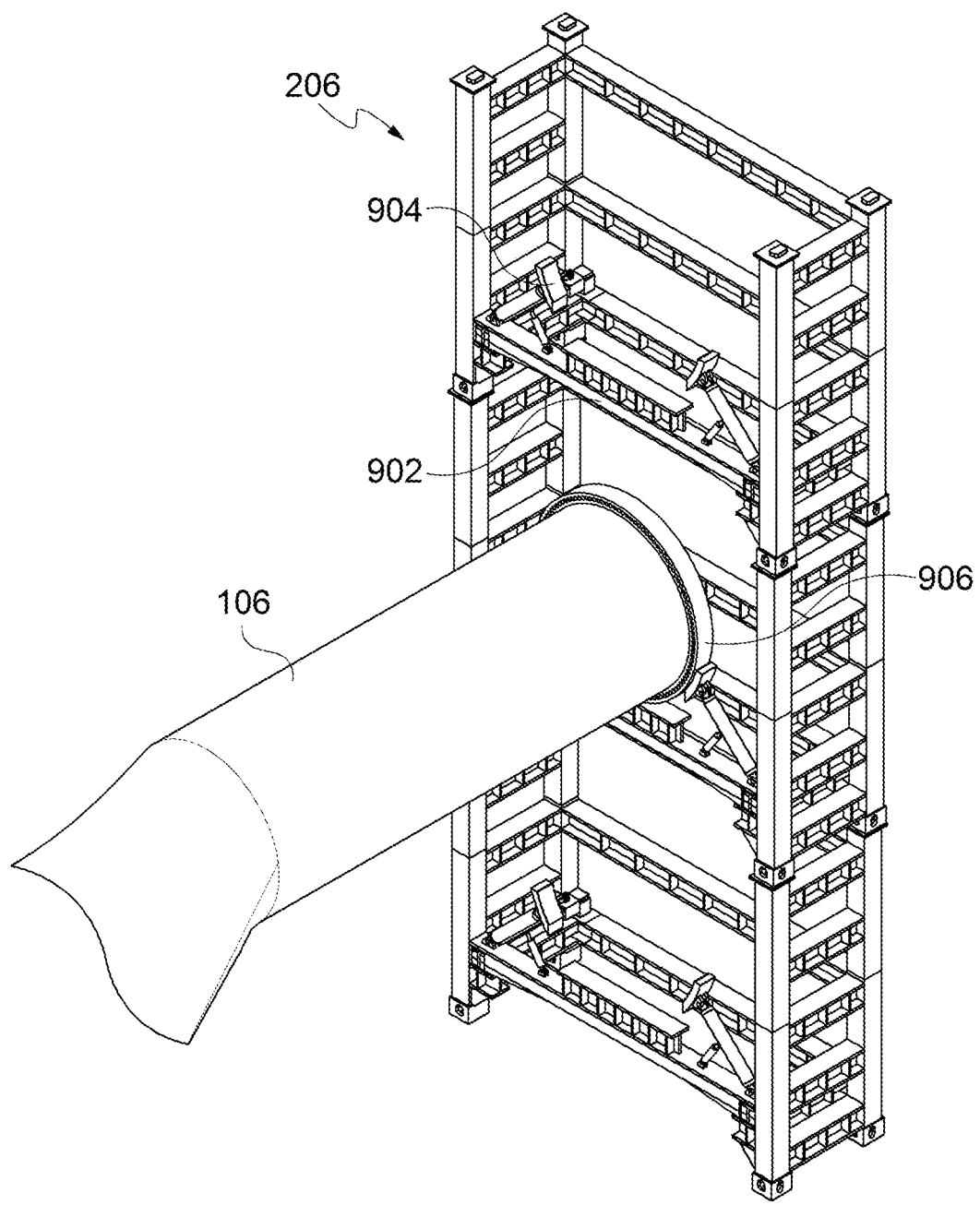
FIG. 9 is an example showing a state in which the other end of the blade of the floating-type offshore wind power generation device is fixed to a second mount according to an embodiment of the present disclosure.
Figure 10:
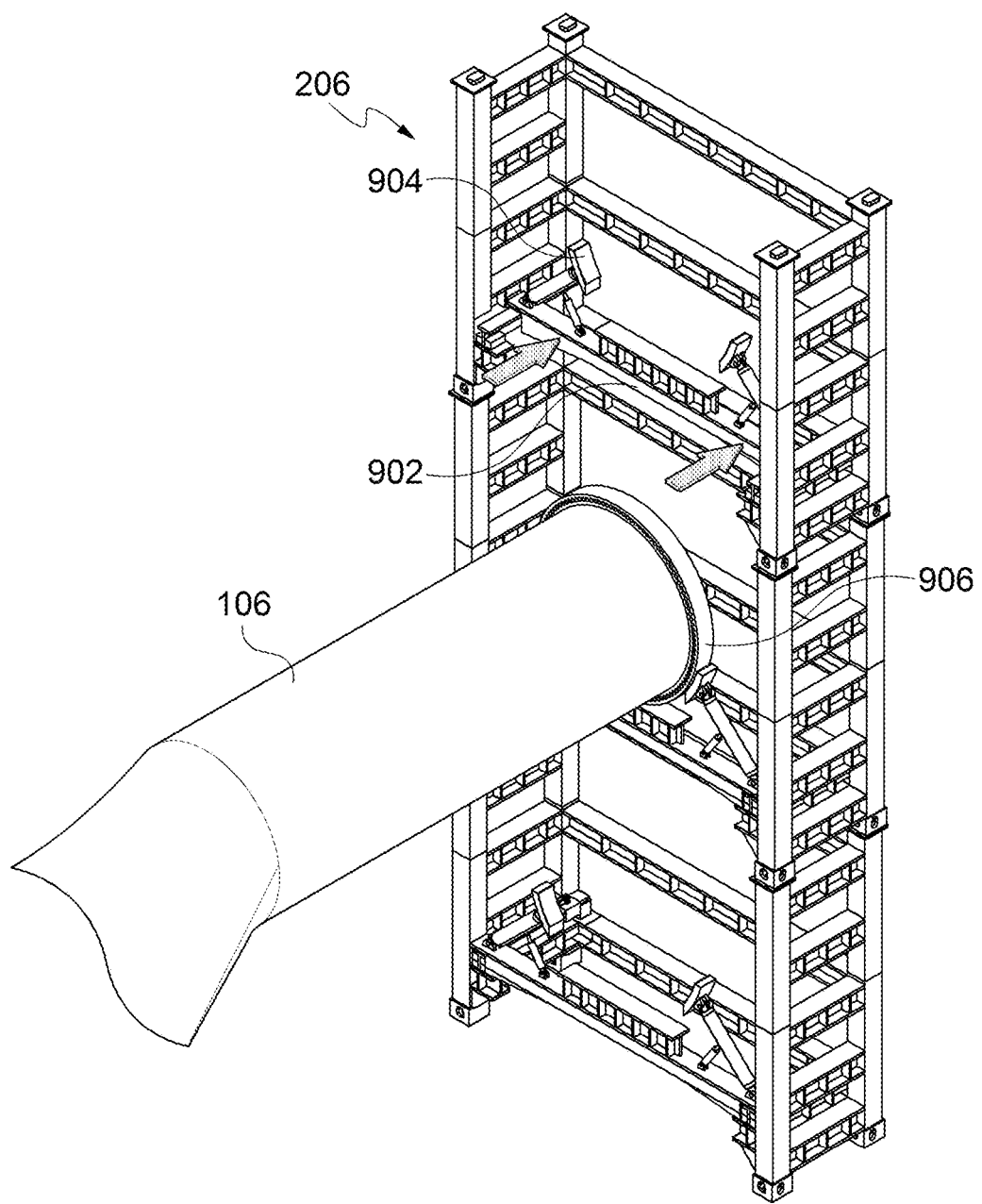
FIG. 10 is an example showing a process of moving a second mounting means backward to lift up the blade fixed to the second mount according to an embodiment of the present disclosure.

FIG. 9 is an example showing a state in which the other end of the blade 106 of the floating-type offshore wind power generation device 100 is fixed to the second mount 206 according to an embodiment of the present disclosure, and FIG. 10 is an example showing a process of moving a second mounting means 902 backward to lift up the blade 106 fixed to the second mount 206 according to an embodiment of the present disclosure.

As described above, the other end of each of the blades 106 may be fixed to and stacked on the second mount 206. Here, the second mount 206 may include a second mounting means 902, a protruding section 904, and a support 906.

As illustrated in FIG. 9, a plurality of second mounting means 902 may be provided at different heights on the second mount 206, and the other end of the blade 106 may be placed on and fixed to one of the plurality of second mounting means 902. Here, the protruding section 904 and the support 906 may be provided in the second mounting means 902.

The protruding section 904 may protrude from one side of the second mounting means 902 and come into close contact with the other end of the blade 106 to support the blade 106. The protruding section 904 may have an end with a plate shape, and a plurality of protruding sections may be provided at set intervals on one side of the second mounting means 902.

Also, the support 906 may be provided above the second mounting means 902 and have a circular shape with a size corresponding to the circumference of the other end of the blade 106. The support 906 may be provided at an end of the protruding section 904, and the blade 106 may be more stably fixed as the other end of the blade 106 is inserted into the support 906.

Here, the second mounting means 902 is moved backward in a direction away from the other end of the blade 106, and thus, it is possible to vertically move the blade positioned below the second mounting means 902. As described above, after one of the plurality of blades 106 is coupled to the nacelle 104 of the tower 102, the other blades except for the blade 106 have to be lifted upward and assembled to the nacelle 104 of the tower 102. Physical interference between the second mounting means 902 and the blade 106 should not occur in the process of vertically moving the blade 106 as described above, and thus, it is necessary to move the second mounting means 902.

To this end, in the present disclosure, the second mounting means 902 is configured to move backward in a direction away from the other end of the blade 106 by a hydraulic jack (not shown) or the like.

Referring to FIG. 10, the second mounting means 902 may move backward in a direction away from the other end of the blade 106. In this case, even if the blade positioned below the second mounting means 902 is vertically moved, physical interference between the blade and the second mounting means 902 does not occur. Accordingly, the blade positioned below the second mounting means 902 may be moved vertically and assembled to the nacelle 104 of the tower 102.

Figure 11:
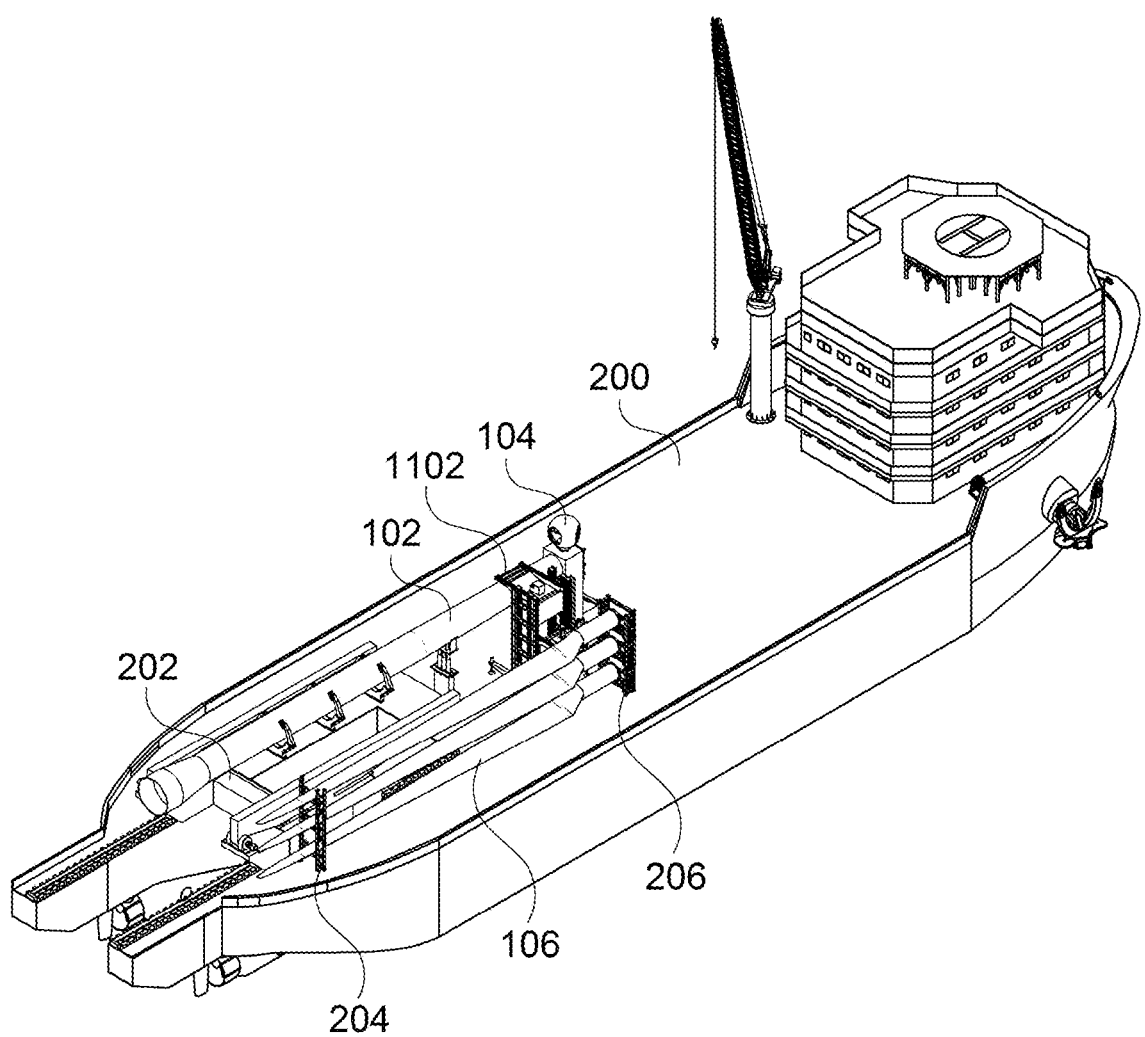
FIG. 11 is an example showing a state in which a blade installer according to an embodiment of the present disclosure is positioned between the tower and the blade.

FIG. 11 is an example showing a state in which a blade installing structure 1102 according to an embodiment of the present disclosure is positioned between the tower 102 and the blade 106.

As described above, the tower 102, the nacelle 104, and the blades 106 may be shipped and transported on the installation ship 200. When the installation ship 200 approaches the vicinity of the floating body 108, a process of assembling the tower 102, the nacelle 104, and the blades 106 may be initiated.

Referring to FIG. 11, for the process of assembling the tower 102, the nacelle 104, and the blades 106, the blade installing structure 1102 may be positioned between the tower 102 and the blades 106 by a carriage (not shown).

Figure 12:
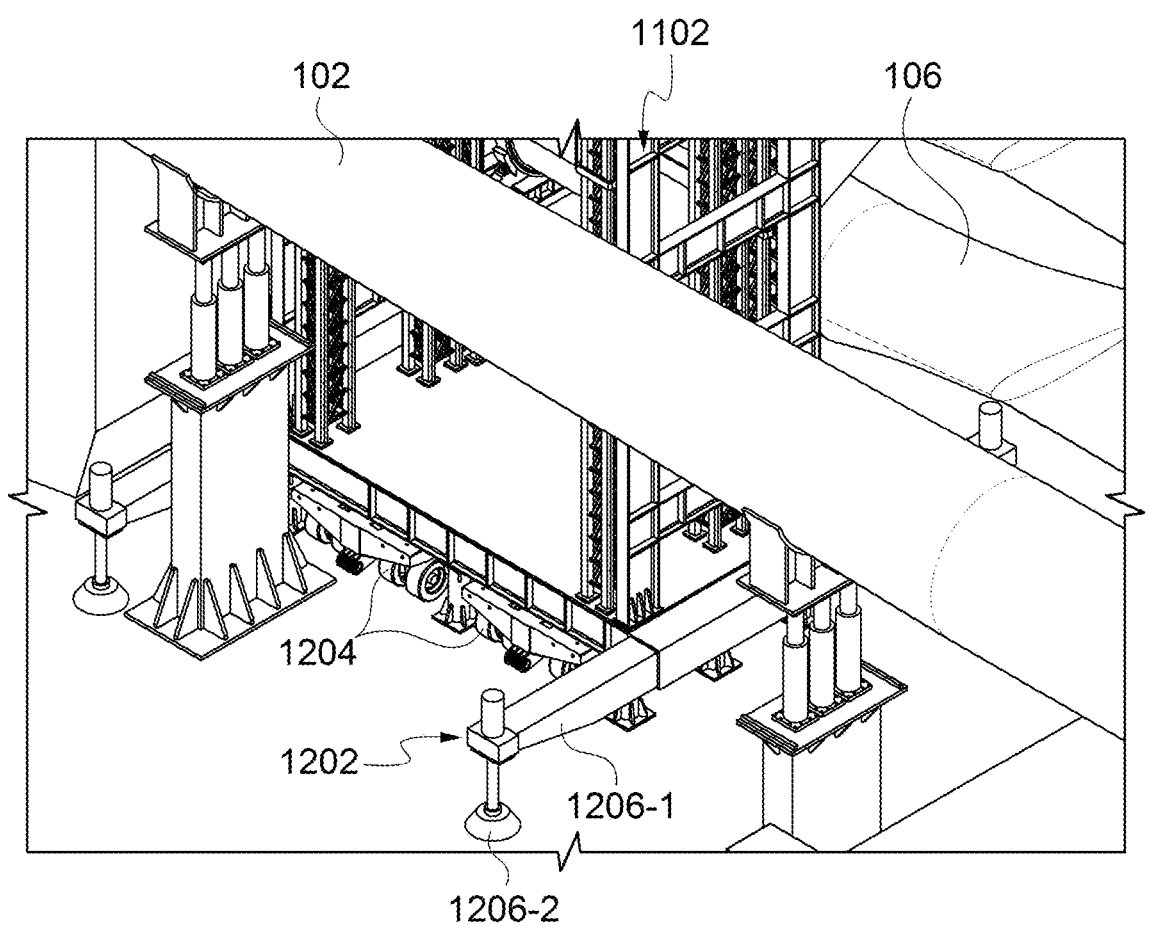
FIG. 12 is an example showing a carriage according to an embodiment of the present disclosure.
Figure 13:
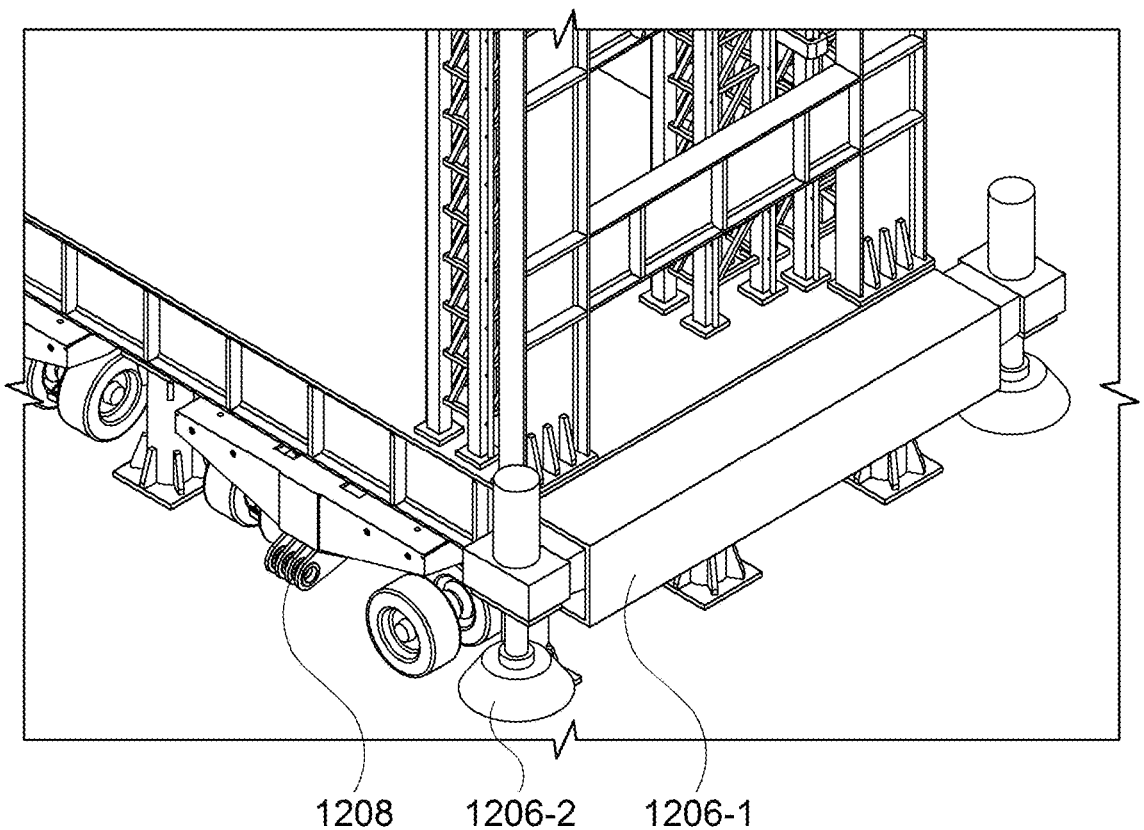
FIG. 13 is an example showing a carriage according to an embodiment of the present disclosure.

FIGS. 12 and 13 are an example showing a carriage 1202 according to an embodiment of the present disclosure.

As described above, the blade installing structure 1102 may be located between the tower 102 and the blades 106 by the carriage 1202. To this end, the carriage 1202 may enter below the blade installing structure 1102, and accordingly, the blade installing structure 1102 may be placed on the carriage 1202.

Referring to FIGS. 12 and 13, the carriage 1202 may include a wheel 1204, a falling preventing frame 1206, and a hydraulic jack 1208.

The wheel 1204 may be disposed below the carriage 1202 and guide movement of to the carriage 1202 so that the carriage 1202 is positioned between the tower 102 and the blade 106. The wheel 1204 is freely rotatable 360 degrees and may be connected to the hydraulic jack 1208. The blade installing structure 1102 may be moved up and down according to an increase or decrease in pressure in the hydraulic jack 1208, which will be described later.

The falling preventing frame 1206 may prevent falling of the carriage 1202. After the carriage 1202 moves and settles at a specific point, the falling preventing frame 1206 may fix the position of the carriage 1202 by using a falling preventing arm 1206-1 and a falling preventing leg 1206-2 and prevent the carriage 1202 from falling. The falling preventing arm 1206-1 may move forward and backward in the horizontal direction, and the falling preventing leg 1206-2 may move upward and downward in the vertical direction. That is, when the falling preventing leg 1206-2 moves vertically to come into close contact with the ground after the falling preventing arm 1206-1 moves in the horizontal direction and settles, the position of the carriage 1202 may be fixed, and accordingly, the falling of the carriage 1202 may be prevented.

The hydraulic jack 1208 is a device for lifting the blade installing structure 1102, and as described above, the blade installing structure 1102 may be moved up and down according to an increase or decrease in pressure in the hydraulic jack 1208.

In a state in which the position of the carriage 1202 is fixed, the tower 102, the nacelle 104, and the blade 106 may be assembled.

Figure 14:
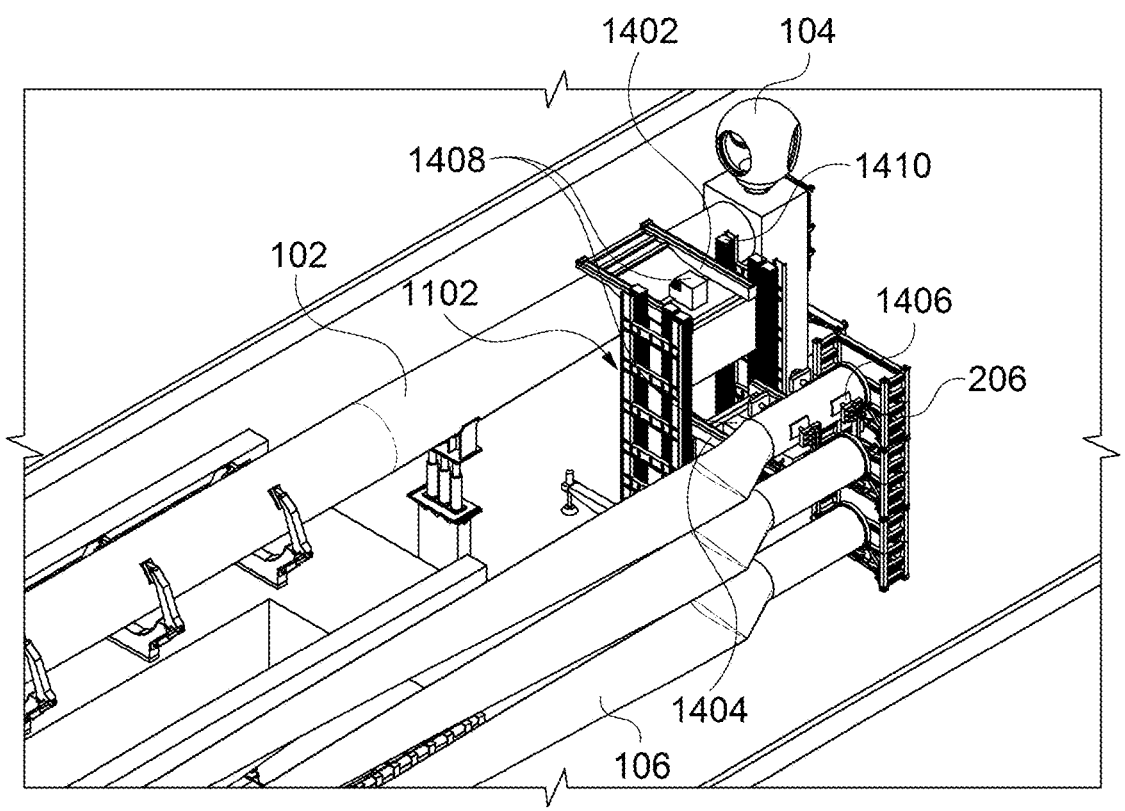
FIG. 14 is an example showing a process of gripping the blade by using the blade installer which is provided on a blade carrier according to an embodiment of the present disclosure.
Figure 15:
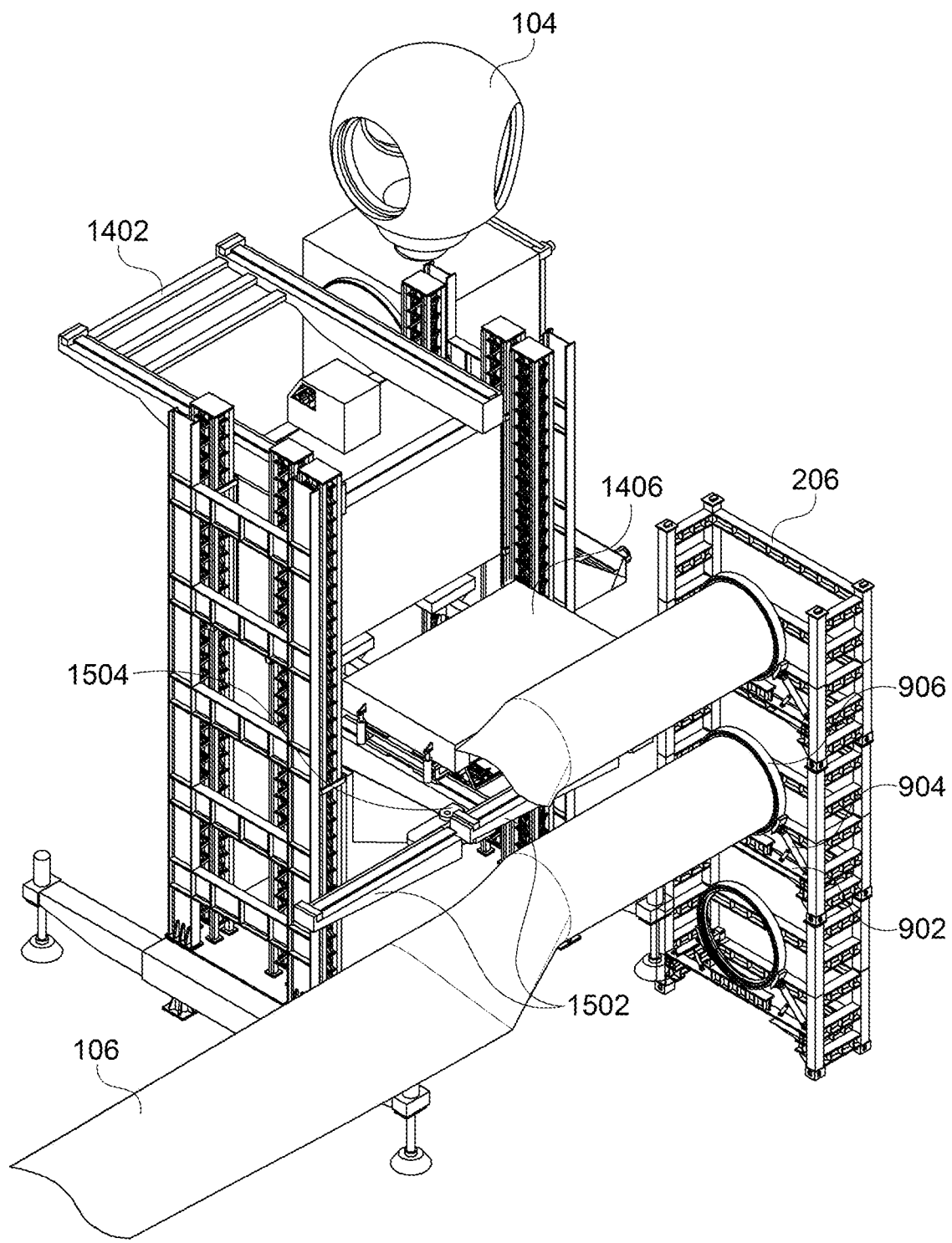
FIG. 15 is an example showing a process of gripping the blade by using the blade installer which is provided on the blade carrier according to an embodiment of the present disclosure.
Figure 16:
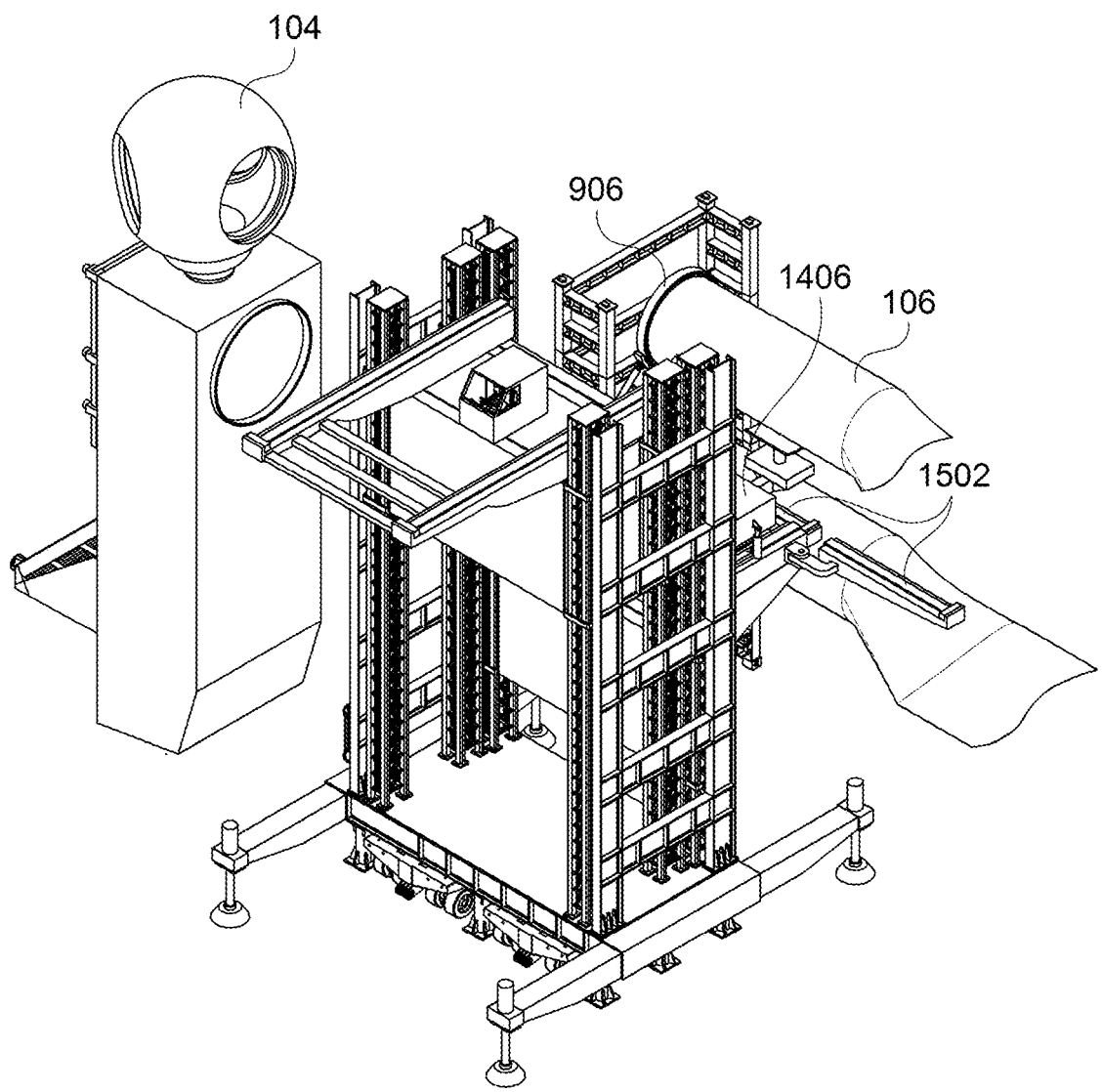
FIG. 16 is an example showing a process of gripping the blade by using the blade installer which is provided on the blade carrier according to an embodiment of the present disclosure.

FIGS. 14 to 16 are an example showing a process of gripping the blade 106 by using a blade installer 1406 which is provided on a blade carrier 1404 according to an embodiment of the present disclosure.

Referring to FIG. 14, a blade assembly table 1402 may be provided on a first side of the blade installing structure 1102, and a blade carrier 1404 may be provided on a second side opposite to the first side. Here, the first side may be, for example, a side facing the tower 102, and the second side may be, for example, a side facing the blade 106.

The blade assembly table 1402 may be positioned on the first side by the carriage 1202 so as to be adjacent to the tower 102, and the blade carrier 1404 may be positioned on the second side by the carriage 1202 so as to be adjacent to the blade 106.

An operation room 1408 may be provided in each of the blade assembly table 1402 and the blade carrier 1404, and a worker may board the operation room 1408 to perform various tasks related to the assembly and installation of the floating-type offshore wind power generation device 100.

Also, the blade assembly table 1402 and the blade carrier 1404 may be vertically moved in the up-down direction by an elevator slide frame 1410.

The blade installer 1406 may be provided on the blade carrier 1404, and the blade installer 1406 may be vertically moved together with the blade carrier 1404 by the elevator slide frame 1410.

Here, the blade carrier 1404 may be vertically moved below the blade 106 that is to be assembled, and the blade 106 may be gripped by the blade installer 1406 provided on the blade carrier 1404. During a process of moving the blade installer 1406 below the blade 106 as described above, it is necessary to fold a rotary arm 1502 provided below the blade installer 1406 so that the rotary arm 1502 does not physically interfere with the blade 106.

Referring to FIGS. 15 and 16, the rotary arm 1502 is rotatable about a rotary shaft 1504, and the rotary arm 1502 is rotated and folded. Thus, when the blade installer 1406 moves vertically in a space in which the blades 106 are stacked, the physical interference with the blades 106 may be prevented. The blade installer 1406 may move forward or backward toward the first side or the second side on the blade carrier 1404. Before the blade installer 1406 completely enters below the blade 106, the rotary arm 1502 may maintain a folded state so as not to physically interfere with the blade 106.

Subsequently, the blade installer 1406 may enter below the blade 106 to grip the blade 106, and in this case, the rotary arm 1502 may be rotated again to face the second side.

Also, the blade carrier 1404 may move vertically so as to correspond to the height of the blade assembly table 1402 in a state in which the blade 106 is gripped by the blade installer 1406.

Figure 17:
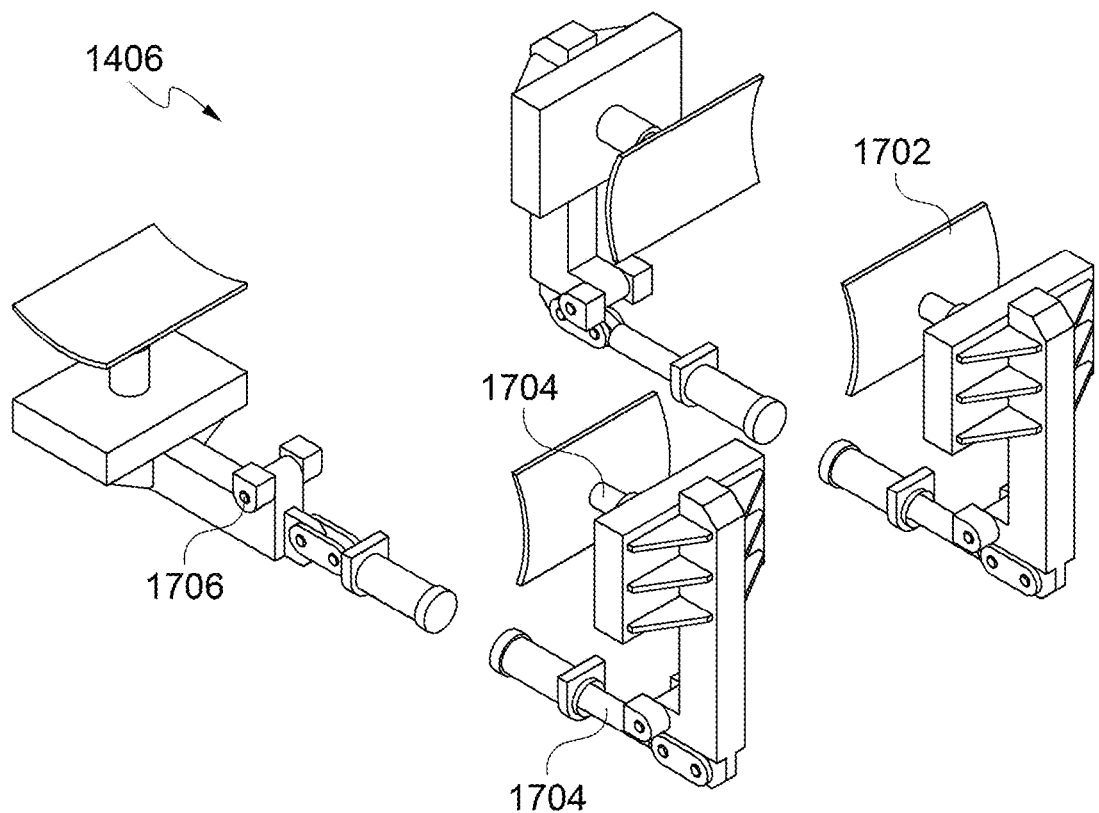
FIG. 17 is an example showing a detailed configuration of the blade installer according to an embodiment of the present disclosure.

FIG. 17 is an example showing a detailed configuration of the blade installer 1406 according to an embodiment of the present disclosure.

Referring to FIG. 17, the blade installer 1406 may include a gripping plate 1702, a hydraulic jack 1704, and a rotary center point 1706.

The gripping plate 1702 is a device for gripping and fixing the blade 106, and a plurality of gripping plates may be provided at different set positions of the blade installer 1406.

The hydraulic jack 1704 may be provided at a position adjacent to the gripping plate 1702 and control forward or backward movement of the gripping plate 1702.

The rotary center point 1706 may be provided at a position adjacent to the gripping plate 1702 and guide the rotation of the gripping plate 1702.

The gripping plate 1702 may be rotated about the rotary center point 1706 or moved forward or backward according to an increase or decrease in pressure in the hydraulic jack 1704, and thus may be brought into close contact with the blade 106. The gripping plate 1702 may completely come into close contact with the blade 106 to fix the blade 106, and in this state, the blade carrier 1404 may vertically move so as to correspond to the height of the blade assembly table 1402.

Figure 18:
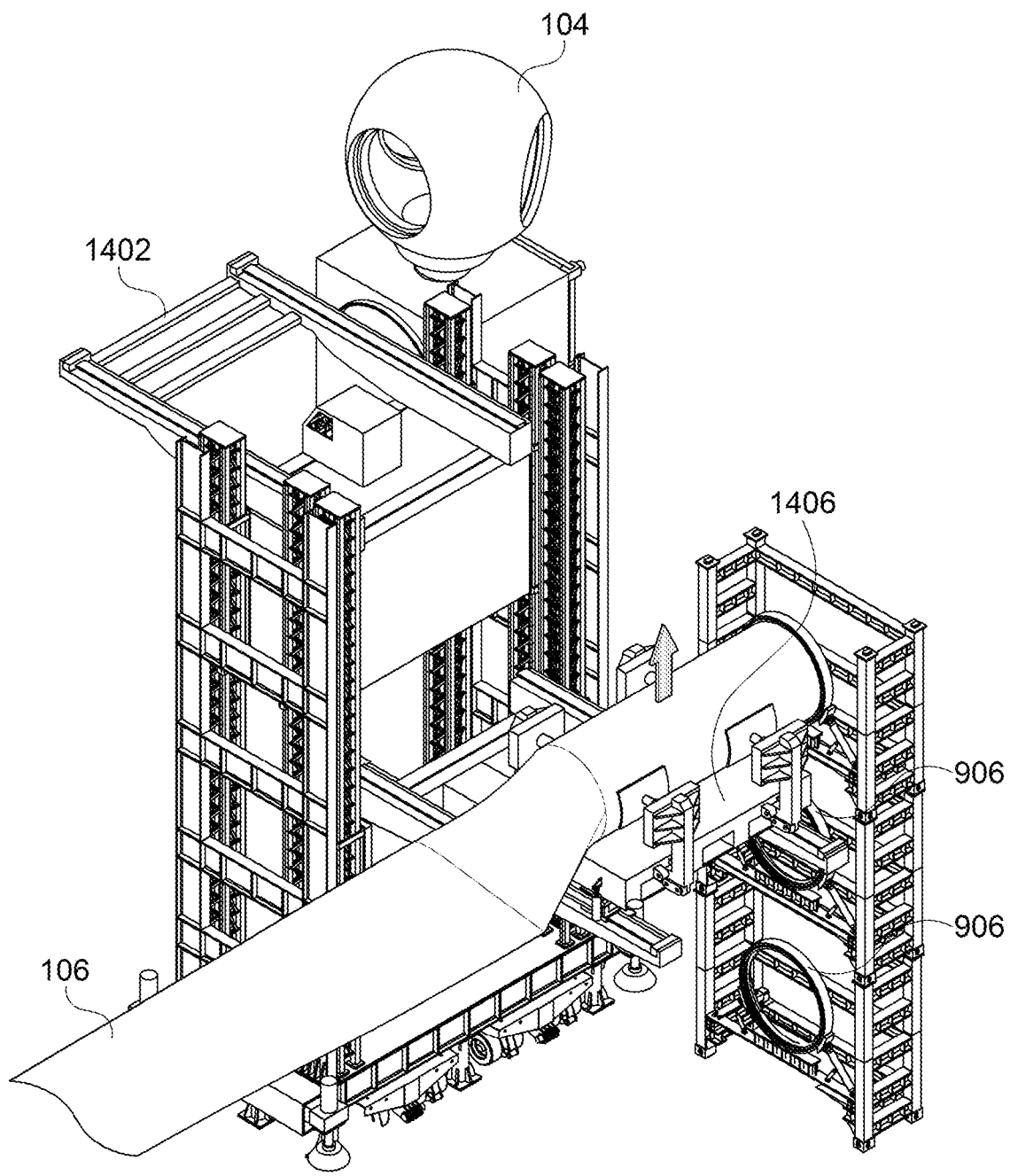
FIG. 18 is an example showing a process in which the blade carrier according to an embodiment of the present disclosure is vertically moving so as to correspond to the height of a blade assembly table.
Figure 19:
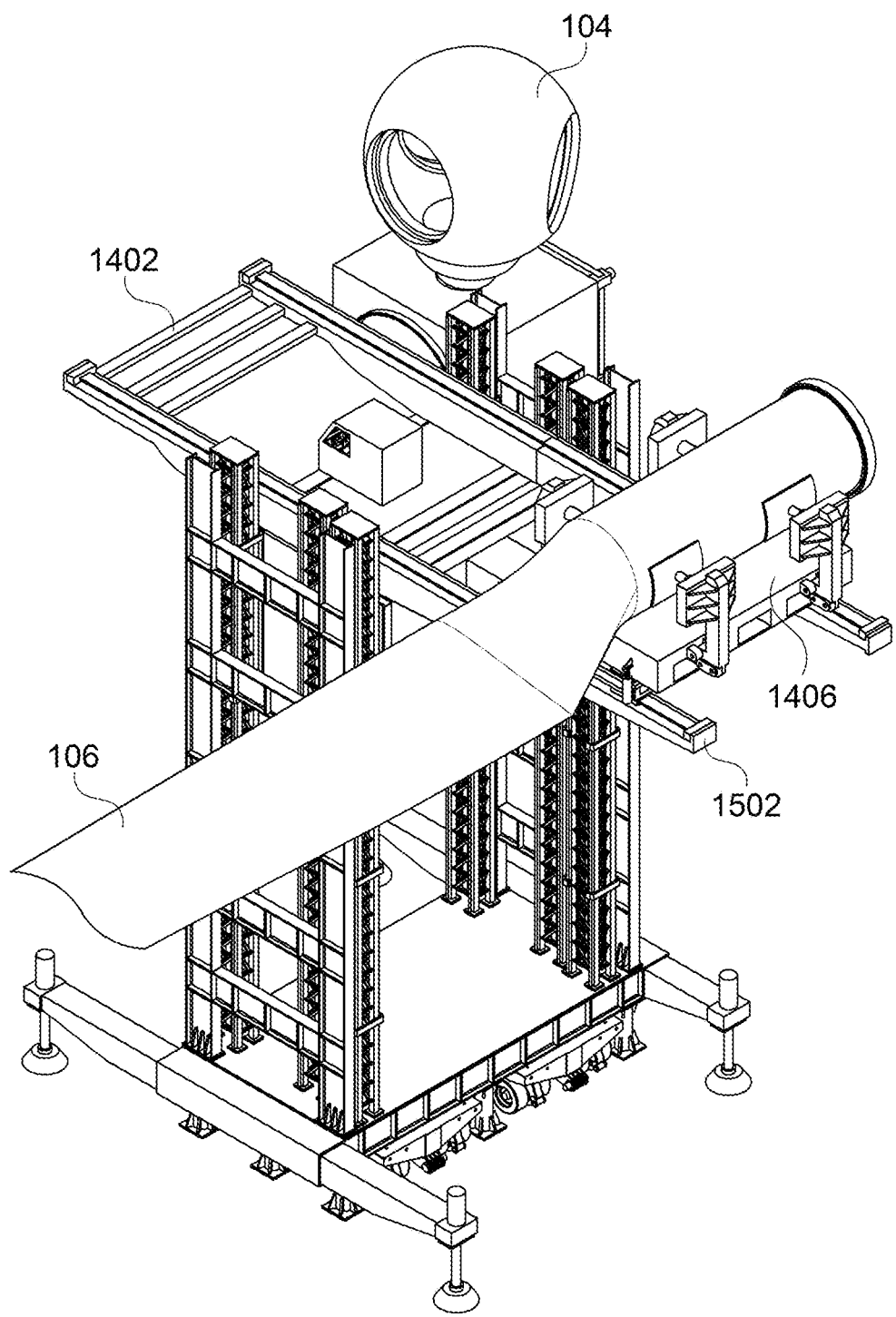
FIG. 19 is an example showing a process in which the blade carrier according to an embodiment of the present disclosure has vertically moved so as to correspond to the height of the blade assembly table.

FIGS. 18 to 19 are an example showing a process in which the blade carrier 1404 according to an embodiment of the present disclosure moves vertically so as to correspond to the height of the blade assembly table 1402.

Referring to FIGS. 18 and 19, when the blade 106 is gripped by the blade installer 1406, the blade carrier 1404 may move vertically so as to correspond to the height of the blade assembly table 1402. In this case, the blade 106 gripped by the blade installer 1406 may also move vertically so as to correspond to the height of the blade assembly table 1402. Meanwhile, before the blade 106 moves vertically, the second mounting means 902 may be moved backward in a direction away from the other end of the blade 106.

Figure 20:
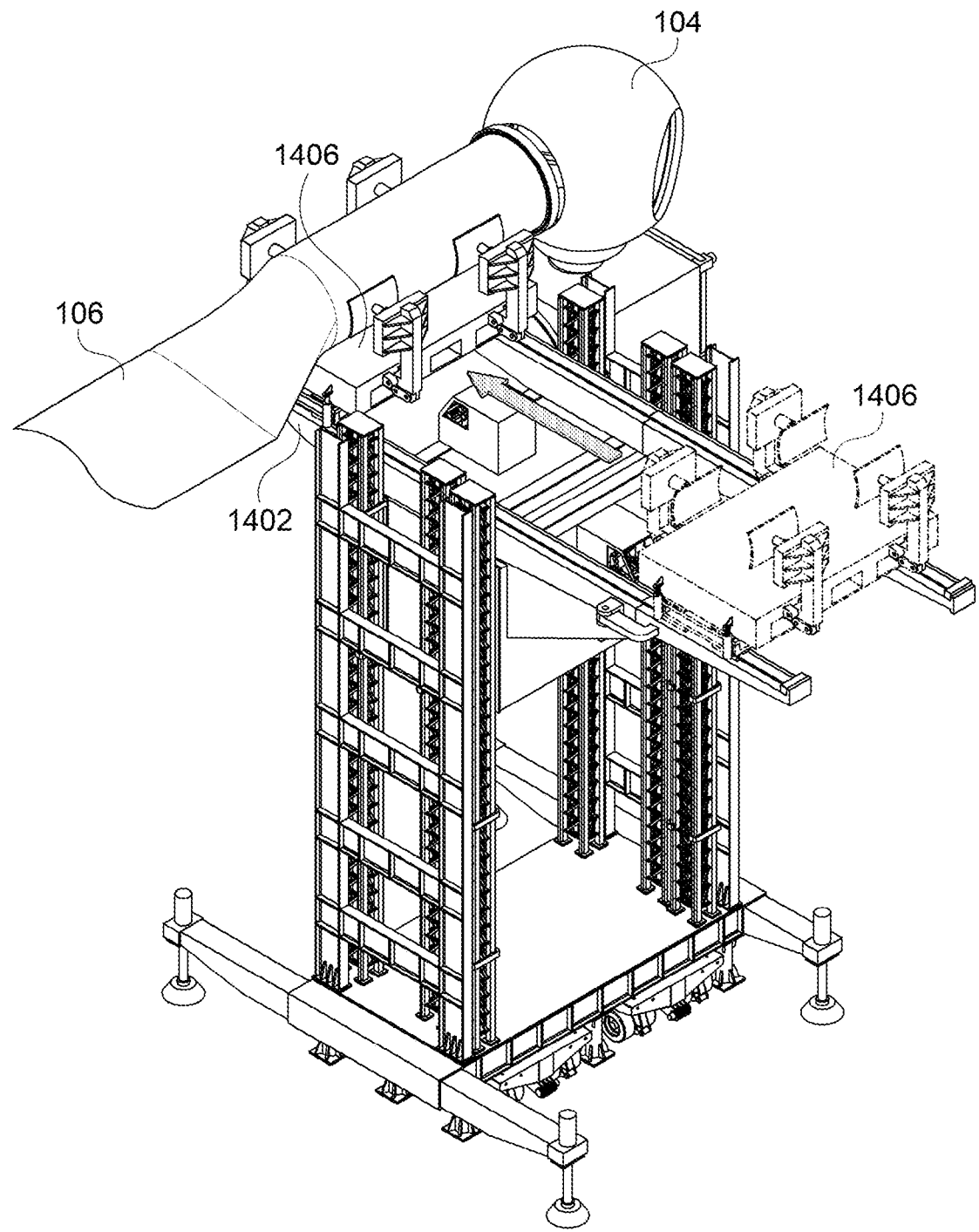
FIG. 20 is an example showing a process in which the blade installer according to an embodiment of the present disclosure moves from a second side to a first side.

FIG. 20 is an example showing a process in which the blade installer 1406 according to an embodiment of the present disclosure moves from the second side to the first side.

The blade installer 1406 may be moved forward or backward toward the first side or the second side on the blade assembly table 1402 and the blade carrier 1404 by motor control or the like.

Referring to FIG. 20, the blade installer 1406 may be moved from the second side to the first side, and accordingly, the blade 106 approaches the tower 102.

Figure 21:
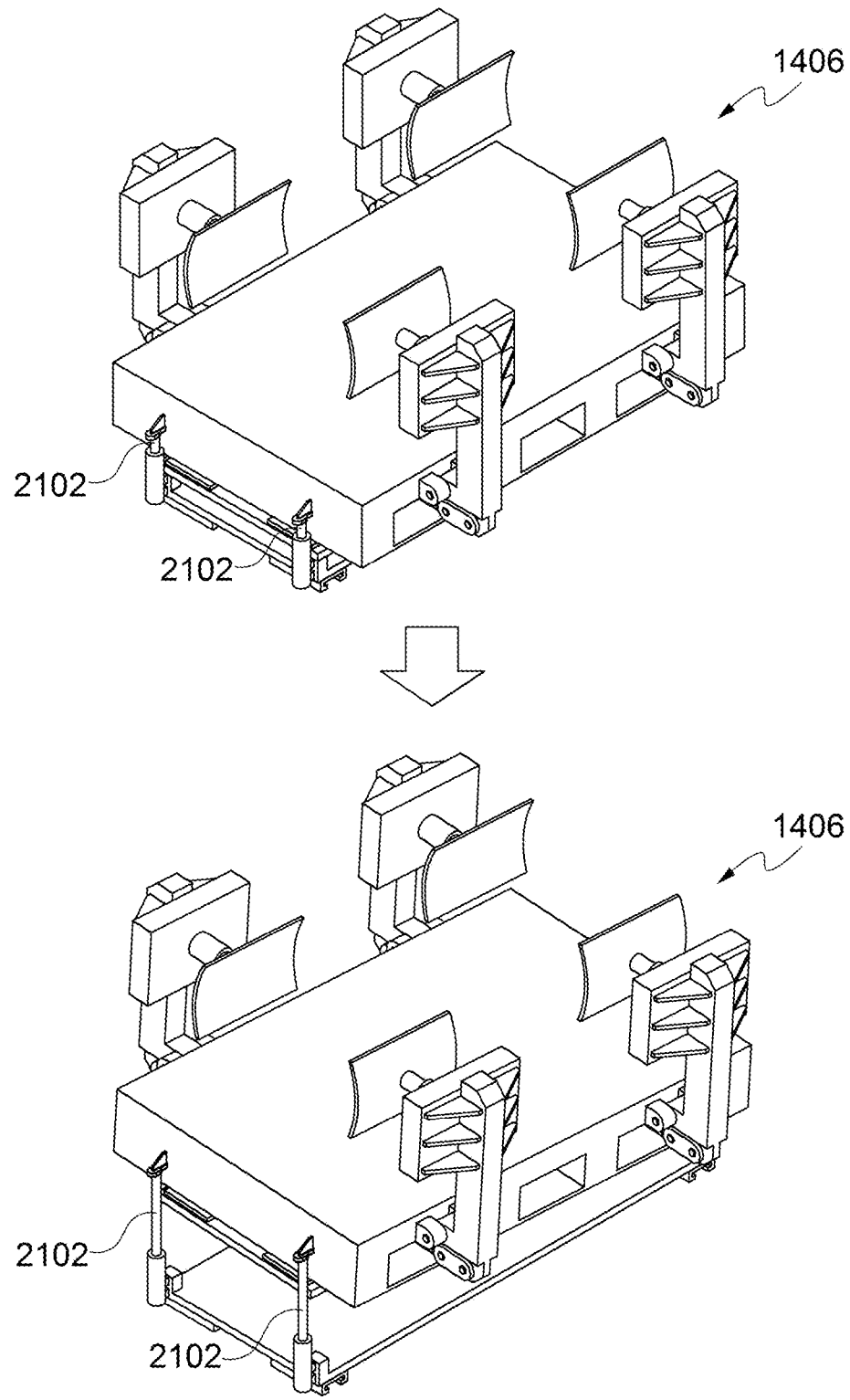
FIG. 21 is an example showing a process in which the blade installer according to an embodiment of the present disclosure is tilted at a set angle.

FIG. 21 is an example showing a process in which the blade installer 1406 according to an embodiment of the present disclosure is tilted at a set angle.

Referring to FIG. 21, a plurality of screw raisers 2102 may be provided below the blade installer 1406, and the angle of the blade installer 1406 may be controlled by the screw raisers 2102. The blade installer 1406 may be inclined at a set angle (e.g., about 5 degrees) by the screw raisers 2102, and in this state, the blade 106 may be assembled to the nacelle 104.

Figure 22:
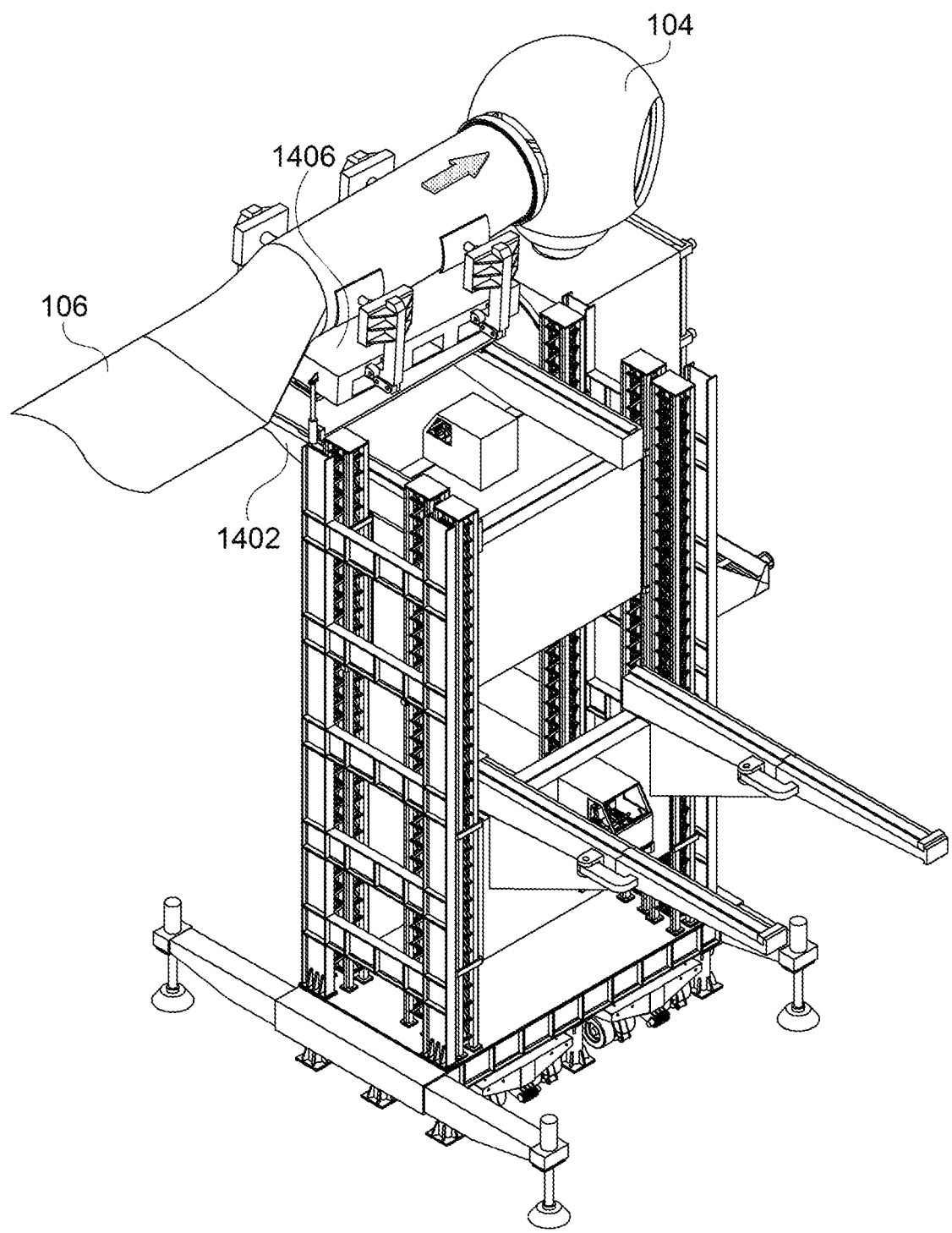
FIG. 22 is an example showing a process in which the blade according to an embodiment of the present disclosure is assembled to a nacelle.

FIG. 22 is an example showing a process in which the blade 106 according to an embodiment of the present disclosure is assembled to the nacelle 104.

Referring to FIG. 22, in a state in which the blade installer 1406 is inclined at the set angle, the blade installer 1406 may enter the nacelle 104. Accordingly, the blade 106 is coupled to the hub of the nacelle 104, and when the assembly is completed, the adhesion of the gripping plate 1702 of the blade installer 1406 may be released.

Figure 23:
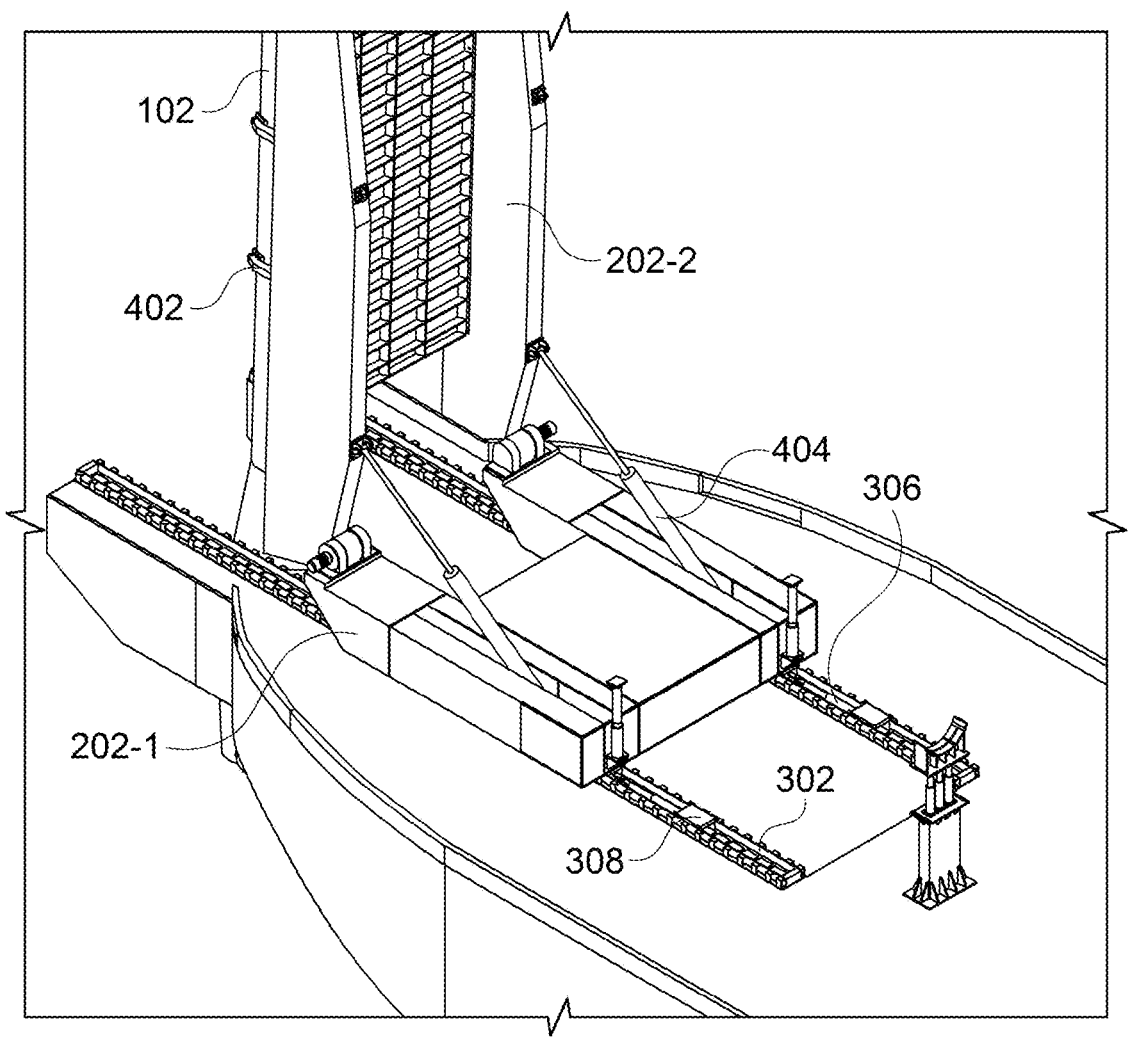
FIG. 23 is an example showing a process in which the tower placed on the tower standing frame is standing in a state in which a plurality of blades according to an embodiment of the present disclosure are assembled.
Figure 24:
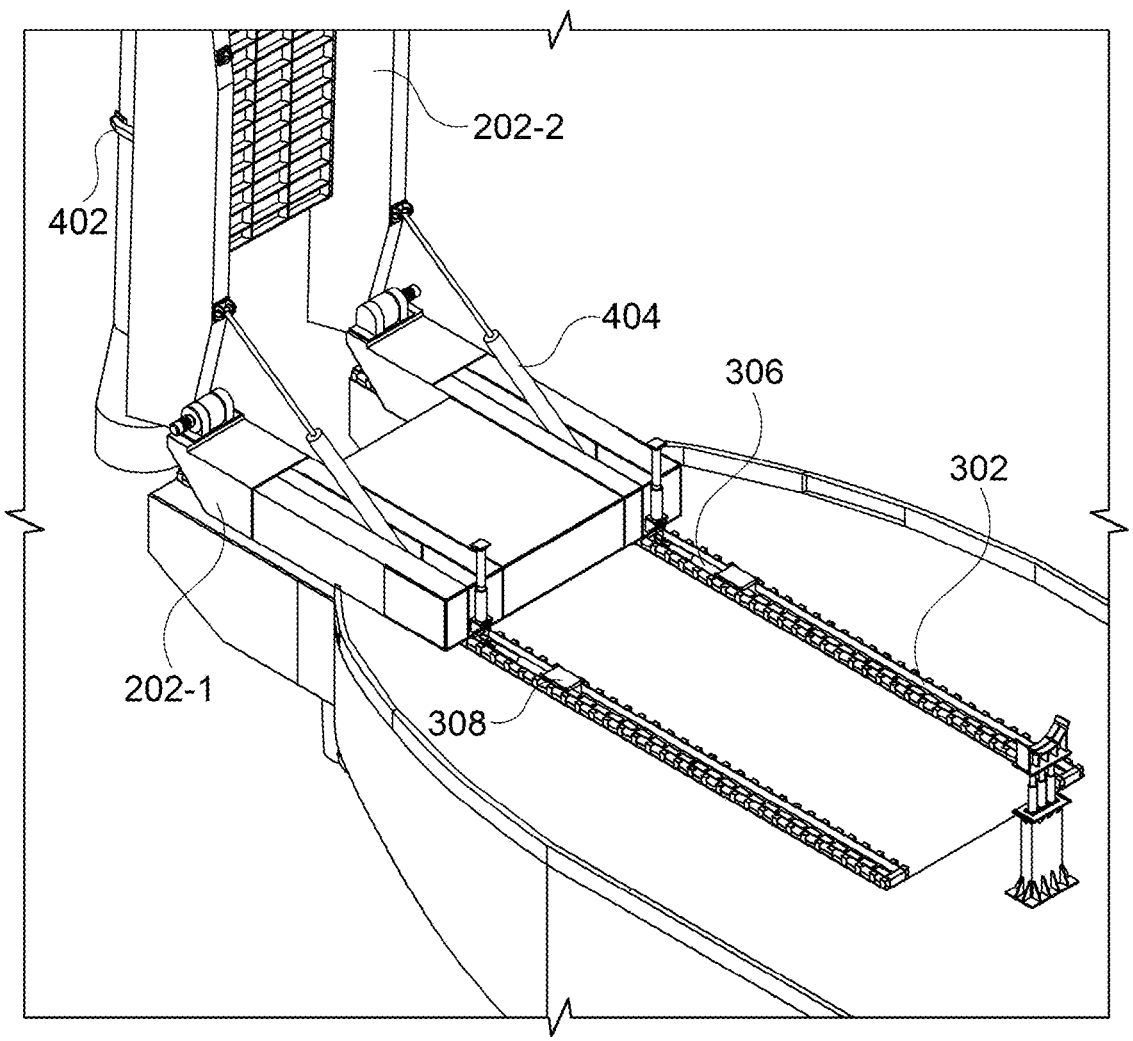
FIG. 24 is an example showing a process in which the position of the floating-type offshore wind power generation device according to an embodiment of the present disclosure is adjusted so that the floating-type offshore wind power generation device is coupled to a floating body.

FIG. 23 is an example showing a process in which the tower 102 placed on the tower standing frame 202 is standing in a state in which the plurality of blades 106 according to an embodiment of the present disclosure are assembled, and FIG. 24 is an example showing a process in which the position of the floating-type offshore wind power generation device 100 according to an embodiment of the present disclosure is adjusted so that the floating-type offshore wind power generation device 100 is coupled to the floating body 108.

When all of the plurality of blades 106 (e.g., three blades) are assembled to the nacelle 104 of the tower 102 in a manner described above, the assembled floating-type offshore wind power generation device 100 has to stand up and be coupled to the floating body 108.

Referring to FIG. 23, the first lifter 404 may be provided on one side of the tower standing frame 202, and the first lifter 404 may make the tower 102 stand up. The length of the first lifter 404 may be increased in a manner such as hydraulic adjustment or motor control, and in this case, the second body 202-2 of the tower standing frame 202 rotates at an angle of about 90 degrees so that the tower 102 may stand up.

Also, referring to FIG. 24, the first body 202-1 of the tower standing frame 202 may be moved along the slide rail 302 by the control of the skid jack 306, and accordingly, the tower 102 may be moved to a position for coupling to the floating body 108.

Figure 25:
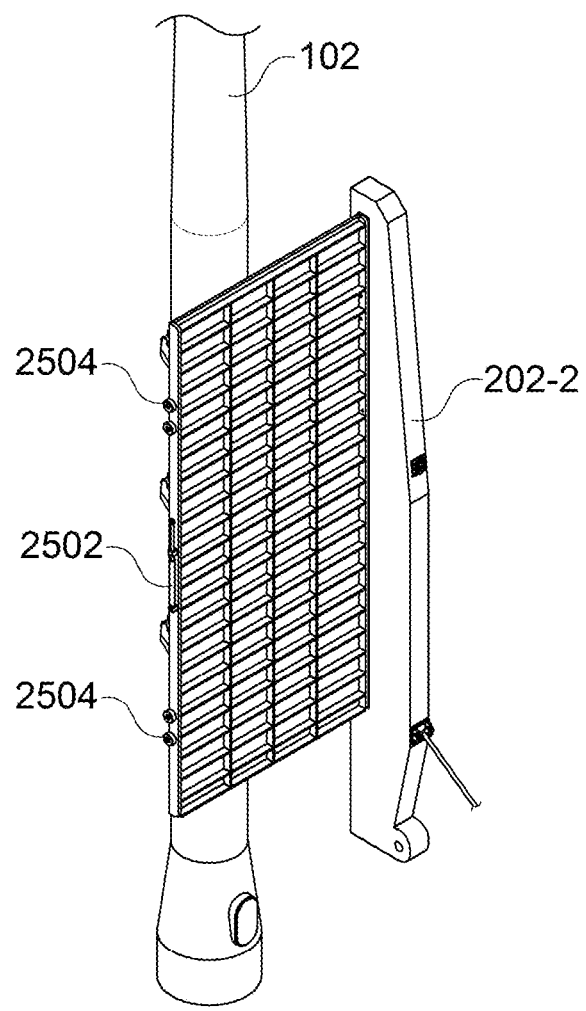
FIG. 25 is an example showing a process in which the height of the floating-type offshore wind power generation device according to an embodiment of the present disclosure is adjusted.

FIG. 25 is an example showing a process in which the height of the floating-type offshore wind power generation device 100 according to an embodiment of the present disclosure is adjusted.

As illustrated in FIG. 25, a height adjustment hydraulic equipment 2502 and a wheel rail 2504 may be provided on one side of the second body 202-2.

The height adjustment hydraulic equipment 2502 may move the wheel rail 2504 up and down according to an increase or decrease in hydraulic pressure. The wheel rail 2504 may be moved up and down according to the control of the height adjustment hydraulic equipment 2502, and in this case, the tower 102 may be moved up and down together with the wheel rail 2504. Accordingly, the height of the tower 102 is adjusted, and the tower 102 may be stably coupled to the floating body 108.

Meanwhile, various control means such as the hydraulic adjustment by the hydraulic jack, the motor control, and the pneumatic control may be employed in order to control the movement, motion, or rotation of the equipment described above during the process of assembling or installing the floating-type offshore wind power generation device 100. Thus, it should be noted that the floating-type offshore wind power generation device 100 may be assembled or installed in an automated manner by such a control means.

According to an embodiment of the present disclosure, the blade installer provided on the blade carrier grips the blade in a state in which the blade installing structure is positioned between the tower and the blades, the blade installer moves toward the blade assembly table after the blade carrier vertically moves to correspond to the height of the blade assembly table, and the blades are assembled to the nacelle formed at one end of the tower. Accordingly, the floating-type offshore wind power generation device may be more easily assembled.

Although the present disclosure has been described in detail with the above representative embodiments, those skilled in the art to which the present disclosure pertains will understand that various modifications to the above-described embodiments are possible without departing from the scope of the present disclosure. Therefore, the scope of the present disclosure should not be limited to the embodiments described above, but defined by not only the appended claims but also their equivalents.

What is claimed is:

1. A method for assembling a wind power generator by using an installation ship for floating-type offshore wind power generation, the method comprising:

placing and fixing a tower of a floating-type offshore wind power generation device to a tower standing frame provided on a bottom surface of the installation ship;

fixing and stacking a plurality of blades comprising a first blade and second blades of the floating-type offshore wind power generation device on a first mount and a second mount provided on the bottom surface of the installation ship;

using a carriage to move a blade installing structure, thereby positioning the blade installing structure between the tower and the plurality of blades, the blade installing structure having a first side and a second side opposite to the first side, the blade installing structure comprising a blade assembly table formed on the first side and a blade carrier formed on the second side;

vertically moving the blade carrier below the plurality of blades so that a blade installer provided on the blade carrier grips each of the plurality of blades;

vertically moving the blade carrier to correspond to a height of the blade assembly table in a state in which the plurality of blades are gripped by the blade installer;

moving the blade installer from the second side to the first side; and assembling the first blade to a nacelle formed at one end of the tower.

2. The method of claim 1, wherein the placing and fixing of the tower of the floating-type offshore wind power generation device to the tower standing frame comprises:

providing a slide rail on the bottom surface of the installation ship;

placing a standing support on the slide rail;

placing the tower standing frame on the standing support; and fixing the tower by using a gripping means provided in the tower standing frame.

3. The method of claim 2, further comprising, after the assembling of the first blade to the nacelle formed at the one end of the tower:

assembling the second blades to the nacelle at set angle intervals; and standing the tower placed on the tower standing frame in a state in which the plurality of blades are assembled.

4. The method of claim 3, wherein the standing of the tower comprises:

placing a stopper and a skid jack on the slide rail;

pushing or pulling the standing support, by using the skid jack between the standing support and the stopper, to move the tower standing frame and the tower to a set position; and standing the tower by using one or more lifters provided in the tower standing frame.

5. The method of claim 4, wherein the pushing or pulling of the standing support, by using the skid jack, to move the tower standing frame and the tower to the set position comprises:

pushing or pulling the standing support, in a state in which the skid jack is supported by the stopper, thereby moving the tower standing frame and the tower to the set position.

6. The method of claim 3, wherein the fixing and stacking of the plurality of blades on the first mount and the second mount comprises:

placing and fixing one end of each of the plurality of blades to one of a plurality of first mounting means provided at different heights on the first mount; and placing and fixing the other end of each of the plurality of blades to one of a plurality of second mounting means provided at different heights on the second mount.

7. The method of claim 6, wherein the placing and fixing of the other end comprises:

providing, above the second mounting means, a support which has a circular shape and a size corresponding to the circumference of the other end of each of the plurality of blades; and inserting the other end of each of the plurality of blades into the support.

8. The method of claim 6, wherein the assembling of the second blades except for the first blade to the nacelle at the set angle intervals comprises:

opening the first mounting means;

moving backward the second mounting means, which is positioned above the second blades, in a direction away from the other ends of the other blades; and moving the second blades upward and assembling the second blades to the nacelle.

9. The method of claim 1, wherein the blade installer grips each of the plurality of blades by a process comprising:

providing a plurality of gripping plates at different positions of the blade installer;

providing a hydraulic jack and a rotary center point at a position adjacent to each of the gripping plates; and rotating the gripping plate about the rotary center point or moving the gripping plate forward or backward according to an increase or decrease in pressure in the hydraulic jack, thereby bringing the gripping plate into close contact with each of the plurality of blades.

10. The method of claim 1, wherein the assembling of the first blade to the nacelle formed at the one end of the tower comprises tilting the blade installer at a set angle and assembling the first blade to the nacelle in a state in which the blade installer tilts.

\* \* \* \* \*